(12) United States Patent
Ono

(10) Patent No.: US 11,144,955 B2
(45) Date of Patent: Oct. 12, 2021

(54) COMMUNICATION SYSTEM AND COMMUNICATION CONTROL METHOD

(71) Applicant: SONY GROUP CORPORATION, Tokyo (JP)

(72) Inventor: Hideyuki Ono, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 227 days.

(21) Appl. No.: 15/770,297

(22) PCT Filed: Oct. 28, 2016

(86) PCT No.: PCT/JP2016/081987
§ 371 (c)(1),
(2) Date: Apr. 23, 2018

(87) PCT Pub. No.: WO2017/130498
PCT Pub. Date: Aug. 3, 2017

(65) Prior Publication Data
US 2018/0315085 A1 Nov. 1, 2018

(30) Foreign Application Priority Data

Jan. 25, 2016 (JP) .............................. JP2016-011663

(51) Int. Cl.
*G06Q 30/00* (2012.01)
*G06Q 30/02* (2012.01)
(Continued)

(52) U.S. Cl.
CPC ......... *G06Q 30/0255* (2013.01); *G06F 16/00* (2019.01); *G06Q 30/0251* (2013.01);
(Continued)

(58) Field of Classification Search
None
See application file for complete search history.

(56) References Cited

U.S. PATENT DOCUMENTS 5,781,887 A * 7/1998 Juang ...................... G10L 15/22
379/88.01
7,912,724 B1 3/2011 Moorer
(Continued)

FOREIGN PATENT DOCUMENTS

CN 102257761 A 11/2011
CN 103021432 A 4/2013
(Continued)

OTHER PUBLICATIONS

• phys.org. World-Class In-Car Speech Recognition System for Navigation in 2005 Honda Cars. (Sep. 2, 2004). Retrieved online Feb. 14, 2021. https://phys.org/news/2004-09-world-class-in-car-speech-recognition-honda.html (Year: 2004).*
(Continued)

*Primary Examiner* — James A Reagan
(74) *Attorney, Agent, or Firm* — Oblon, McClelland, Maier & Neustadt, L.L.P.

(57) ABSTRACT

The present disclosure describes a communication system that includes communication circuitry and processing circuitry. The processing circuitry is configured to collect a piece of user information of a user via the communication circuitry, analyze the collected piece of user information to obtain a user preference of the user, and identify a piece of advertisement as targeting the user according to the user preference. The processing circuitry is further configured to generate a guidance message based on reason of promotion information stored in association with the piece of advertisement, transmit the guidance message to a client terminal of the user, and transmit the piece of advertisement to the client terminal. The guidance message and the piece of advertisement are to be output as vocalized speeches of a voice agent of the client terminal.

14 Claims, 22 Drawing Sheets

(51) Int. Cl.
*G06Q 50/00* (2012.01)
*G06F 16/00* (2019.01)
*G06Q 30/06* (2012.01)

(52) U.S. Cl.
CPC ..... *G06Q 30/0257* (2013.01); *G06Q 30/0267* (2013.01); *G06Q 30/0613* (2013.01); *G06Q 50/01* (2013.01)

(56) References Cited

U.S. PATENT DOCUMENTS

| | | | | |
|---|---|---|---|---|
| 8,768,759 | B2* | 7/2014 | Ghosh | G06Q 30/0207 705/14.1 |
| 2003/0115098 | A1 | 6/2003 | Kang | |
| 2004/0104842 | A1* | 6/2004 | Drury | G08G 1/096883 342/357.31 |
| 2007/0050191 | A1* | 3/2007 | Weider | G10L 21/06 704/275 |
| 2010/0125525 | A1* | 5/2010 | Inamdar | G06Q 30/02 705/80 |
| 2011/0153329 | A1* | 6/2011 | Moorer | G10L 15/10 704/254 |
| 2013/0304541 | A1* | 11/2013 | Sloan | G06Q 30/0202 705/7.31 |
| 2014/0236708 | A1* | 8/2014 | Wolff | G06Q 30/0273 705/14.41 |
| 2015/0134456 | A1* | 5/2015 | Baldwin | H04W 8/18 705/14.64 |
| 2015/0324863 | A1* | 11/2015 | Pugh | G06Q 30/0226 705/14.27 |
| 2015/0379568 | A1 | 12/2015 | Balasubramanian et al. | |
| 2015/0379583 | A1 | 12/2015 | Balasubramanian et al. | |
| 2015/0379981 | A1 | 12/2015 | Balasubramanian et al. | |
| 2015/0379989 | A1* | 12/2015 | Balasubramanian | G06Q 30/0257 704/233 |
| 2017/0068423 | A1* | 3/2017 | Napolitano | G06F 3/0482 |

FOREIGN PATENT DOCUMENTS

| | | | | |
|---|---|---|---|---|
| CN | 105791100 | A * | 7/2016 | ............ H04L 12/58 |
| JP | 2002-297626 | A | 10/2002 | |
| JP | 2003-22278 | | 1/2003 | |
| JP | 2003106842 | A * | 4/2003 | ............ G01C 21/00 |
| JP | 2003-263674 | A | 9/2003 | |
| JP | 2005-63057 | | 3/2005 | |
| JP | 2007-279971 | | 10/2007 | |
| JP | 2012-226455 | A | 11/2012 | |
| JP | 2015-82133 | A | 4/2015 | |
| WO | WO-2016051693 | A1 * | 4/2016 | ............ G06Q 30/06 |

OTHER PUBLICATIONS

• Ivan Habernal. Text, Speech, and Dialogue. (Sep. 2013). Retrieved online Jun. 5, 2021. https://link.springer.com/content/pdf/10.1007%2F978-3-642-40585-3.pdf (Year: 2013).*
• Gabrie L S Kantze. Error Handling in Spoken Dialogue Systems: Managing Uncertainty, Grounding and Miscommunication. (2007). Retrieved online Jun. 5, 2021. https://www.speech.kth.se/prod/publications/files/3101.pdf (Year: 2007).*
Extended Search Report dated Oct. 11, 2018 in European Patent Application No. 16888083.9.
International Search Report dated Dec. 6, 2016 in PCT/JP2016/081987 filed Oct. 28, 2016.

* cited by examiner

FIG. 13

| AGENT ID | QUESTION SENTENCE | ADVERTISEMENT CONTENT | CONDITION, ETC. | PROBABILITY 0~1 |
|---|---|---|---|---|
| CHARACTER A | CHOCOLATE | CHOCOLATE NEWLY RELEASED BY BB COMPANY IS DELICIOUS BECAUSE MILK IS CONTAINED MUCH | USER IS 30 YEARS OLD OR LESS | 0.5 |
| CHARACTER A, PERSON B | I WANT TO EAT SOME DELICIOUS FOOD | I HEARD THAT GRILLED MEAT AT CC STORE IS DELICIOUS | YEAR-END PARTY SEASON (DEC.) | 0.5 |
| ALL | I'M THIRSTY | AA WATER (BRAND NAME) IS GOOD FOR THIRST | — | 0.1 |

COMMUNICATION SYSTEM AND COMMUNICATION CONTROL METHOD

TECHNICAL FIELD

The present disclosure relates to a communication system and a communication control method.

BACKGROUND ART

In recent years, with the development of communication technologies, messages have frequently been exchanged via networks. Users can use information processing terminals such as smartphones, mobile phone terminals, and tablet terminals to confirm messages transmitted from other terminals and transmit messages.

In addition, with information processing terminals, agent systems that perform automatic responses to messages of users have been proposed. With regard to such systems, for example, Patent Literature 1 discloses that an agent of a navigation device mounted in a vehicle performs automatic information exchange with an agent of a portable communication terminal of a passenger to reproduce preferred music of the passenger or reproduce preferred music written in profile data of the passenger.

In addition, Patent Literature 2 discloses a mutual extension system in which one electronic device shares and utilizes learned content in a case in which a plurality of electronic devices are connected to each other in a wireless or wired manner.

In addition, Patent Literature 3 discloses a system in which a certain agent device stores a learned preference of a user in a recording medium (an SD card) and another agent device can read and use a preference of the user learned by the other agent device from the recording medium when the recording medium is inserted into the other agent device.

CITATION LIST

Patent Literature

Patent Literature 1: JP 2003-22278A
Patent Literature 2: JP 2005-063057A
Patent Literature 3: JP 2007-279971A

DISCLOSURE OF INVENTION

Technical Problem

Herein, as one method of proposing advertisements to users on the Internet, there is a method of analyzing preferences from search histories or the like of the users and selecting and presenting advertisements to which the users are estimated to show positive responses, but an advertisement effect is not necessarily produced. That is, the preferences can be analyzed for treatment from explicit requests such as search keywords or browsed goods, but advertisements are not placed in consideration of potential preferences or requests of users.

Accordingly, the present disclosure proposes a communication system and a communication control method capable of arousing potential requests of users and presenting more effective advertisement information.

Solution to Problem

According to the present disclosure, there is provided a communication system including: a communication unit configured to collect a use situation of a service or a client terminal of a user; and a control unit configured to analyze a preference in accordance with the use situation of the user collected via the communication unit, to transmit a guidance message for arousing interest in a specific product to a client terminal of the user via the communication unit such that the guidance message is output as speech of an agent of the client terminal when at least the one user is determined to be a potential customer of the product in accordance with an analysis result of the preference, and to perform control such that an advertisement for promoting the product is transmitted to the client terminal of the user via the communication unit and the advertisement is output as speech of the agent of the client terminal at a predetermined timing after the transmission of the guidance message.

According to the present disclosure, there is provided a communication control method including: by a processor, collecting a use situation of a service or a client terminal of a user via a communication unit; analyzing a preference in accordance with the use situation of the user collected via the communication unit; transmitting a guidance message for arousing interest in a specific product to a client terminal of the user via the communication unit such that the guidance message is output as speech of an agent of the client terminal when at least the one user is determined to be a potential customer of the product in accordance with an analysis result of the preference; and performing control such that an advertisement for promoting the product is transmitted to the client terminal of the user via the communication unit such that the advertisement is output as speech of the agent of the client terminal at a predetermined timing after the transmission of the guidance message.

Advantageous Effects of Invention

According to the present disclosure described above, it is possible to arouse potential requests of users and present more effective advertisement information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram illustrating an example of advertisement information registered in an advertisement DB according to the embodiment.

MODE(S) FOR CARRYING OUT THE INVENTION

Figure 1:
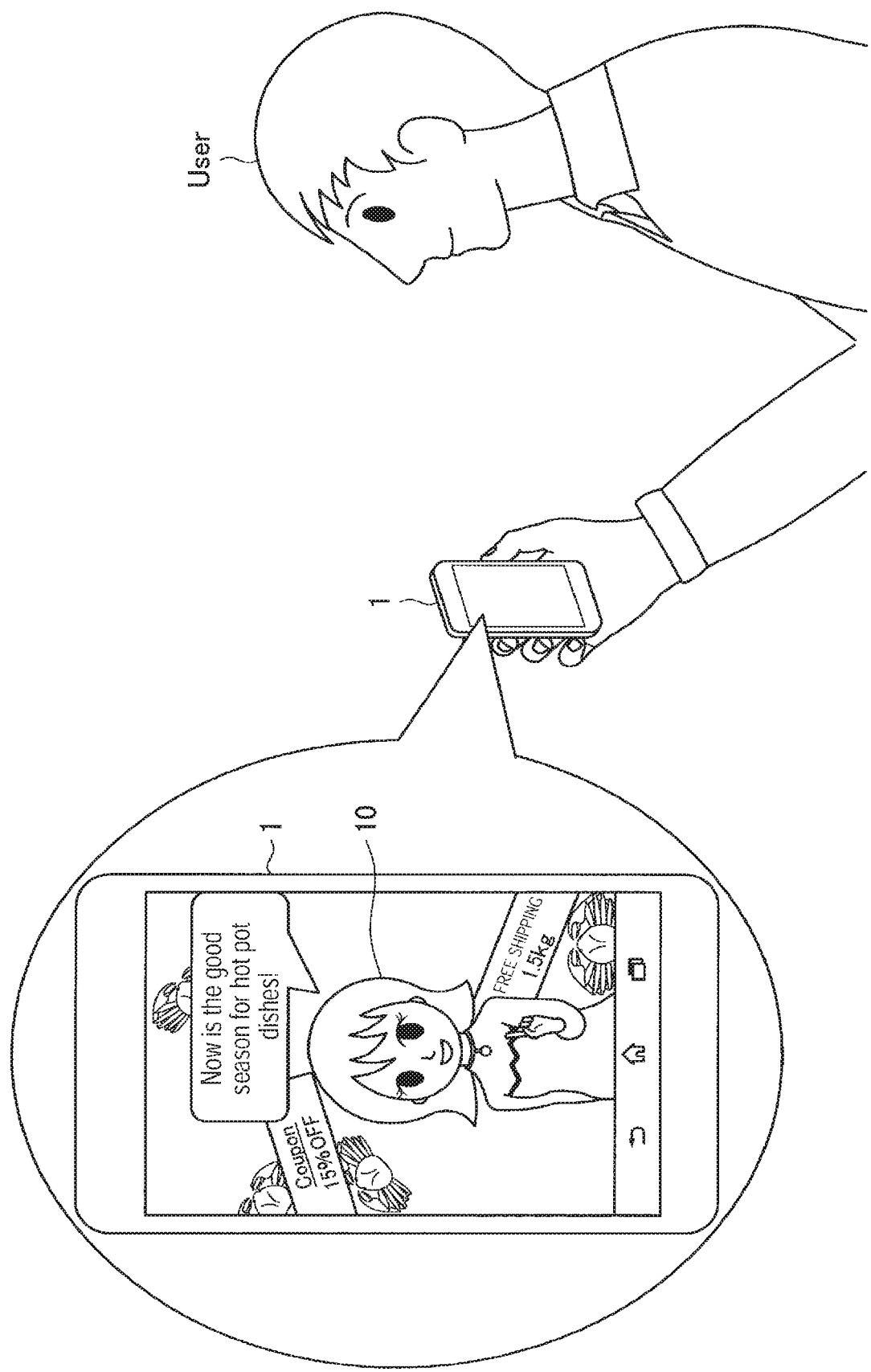
FIG. 1 is an explanatory diagram illustrating an overview of a communication control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Overview of communication control system according to embodiment of the present disclosure
2. Configuration
2-1. System configuration
2-2. Server configuration
3. System operation process
3-1. Conversation data registration process
3-2. Phoneme DB generation process
3-3. Dialogue control process
3-4. Conversation DB updating process
3-5. Advertisement insertion process
4. Advertisement insertion process
4-1. Configuration
4-2. Operation process
5. Conclusion 1. OVERVIEW OF COMMUNICATION CONTROL SYSTEM ACCORDING TO EMBODIMENT OF THE PRESENT DISCLOSURE A communication control system according to an embodiment of the present disclosure is capable of arousing potential requests of users and presenting more efficient advertisement information. Hereinafter, an overview of the communication control system according to the embodiment will be described with reference to FIG. 1.

FIG. 1 is an explanatory diagram illustrating the overview of the communication control system according to an embodiment of the present disclosure. A dialogue with an agent 10 can be performed via, for example, a client terminal 1 such as a smartphone owned by a user. The client terminal 1 includes a microphone and a speaker, and thus is capable of performing a dialogue with the user by voice.

The user normally carries the client terminal 1 and uses the client terminal 1 to confirm a schedule or browse message communication with friends or the Internet. At this time, the virtual agent 10 is displayed on a display screen of the client terminal 1 to perform user assistance. For example, on the basis of registered schedule information, the agent 10 informs the user that "It's almost time to leave!" by voice and performs road guidance to a destination when a time for the user to leave arrives. In addition, when the client terminal 1 receives a message from another user, the agent 10 can inform the user "Look, you have a message!" by voice and can also read out the content of the message. In this way, the agent 10 assists the user with daily use of the client terminal 1 or a service by voice and improves the value of the client terminal 1 or the service.

The communication control system according to the embodiment helps the user in his or her daily life using the agent 10, as described above, and determines whether the user is a potential customer of a predetermined product, that is, whether the user is a customer who expresses interest in the predetermined product. Then, in a case in which the user is a potential customer, an advertisement effect can be improved by causing the agent 10 to output a guidance message and encourage the user to purchase a product.

For example, in the example illustrated in FIG. 1, in a case in which it is determined that the user is a potential customer of a "crab hot pot" (hot pot cooking in which crab is used), the agent 10 can say "Now is the good season for hot pot dishes!" as illustrated in FIG. 1, to induce interest in the advertised product (in this example, "crab hot pot") or can present an image (for example, an image of a crab or an image of a coupon) related to the advertised product in the background of the agent 10 so that a potential interest of the user can be aroused. Then, after the interest of the user is aroused in this way, the advertised product is presented again at a predetermined timing.

In this way, by guiding the user so that his or her interest is aroused with dialogue with the agent 10 that regularly assists the user and then presenting an advertised product, compared to an Internet advertisement method of presenting advertisement information to the user at the beginning through a popup advertisement or an advertisement banner displayed while the user browses a web site, a potential request of the user can be aroused naturally, and thus an improvement in the advertisement effect is expected.

In addition, the communication control system (agent system) according to the embodiment is not limited to a voice agent that performs a response by voice, and a text treatment agent that performs a response on a text basis may be used in the client terminal 1.

2. CONFIGURATION

<2-1. System Configuration>

Figure 2:
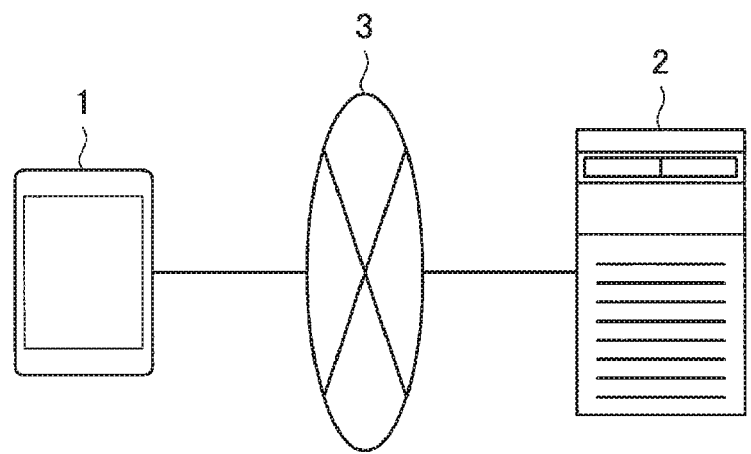
FIG. 2 is a diagram illustrating an overall configuration of the communication control system according to the embodiment.

Next, an overall configuration of the above-described communication control system according to the embodiment will be described with reference to FIG. 2. FIG. 2 is a diagram illustrating an overall configuration of the communication control system according to the embodiment.

As illustrated in FIG. 2, the communication control system according to the embodiment includes the client terminal 1 and an agent server 2.

The agent server 2 is connected to the client terminal 1 via a network 3 and transmits and receives data. Specifically, the agent server 2 generates response voice to spoken voice collected and transmitted by the client terminal 1 and transmits the response voice to the client terminal 1. The agent server 2 includes a phoneme database (DB) corresponding to one or more agents and can generate response voice through the voice of a specific agent. Herein, the agent may be a character of a cartoon, an animation, a game, a drama, or a movie, an entertainer, a celebrity, a historical person, or the like or may be, for example, an average person of each generation without specifying an individual. In addition, the agent may be an animal or a personified character. In addition, the agent may be a person in whom the personality of the user is reflected or a person in whom the personality of a friend, a family member, or an acquaintance of the user is reflected.

In addition, the agent server 2 can generate response content in which the personality of each agent is reflected. The agent server 2 can supply various services such as management of a schedule of the user, transmission and reception of messages, and supply of information through dialogue with the user via the agent.

The client terminal 1 is not limited to the smartphone illustrated in FIG. 2. For example, a mobile phone terminal, a tablet terminal, a personal computer (PC), a game device, a wearable terminal (smart eyeglasses, a smart band, a smart watch, or a smart necklace) may also be used. In addition, the client terminal 1 may also be a robot.

The overview of the communication control system according to the embodiment has been described above. Next, a configuration of the agent server 2 of the communication control system according to the embodiment will be described specifically with reference to FIG. 3.

<2-2. Agent Server 2>

Figure 3:
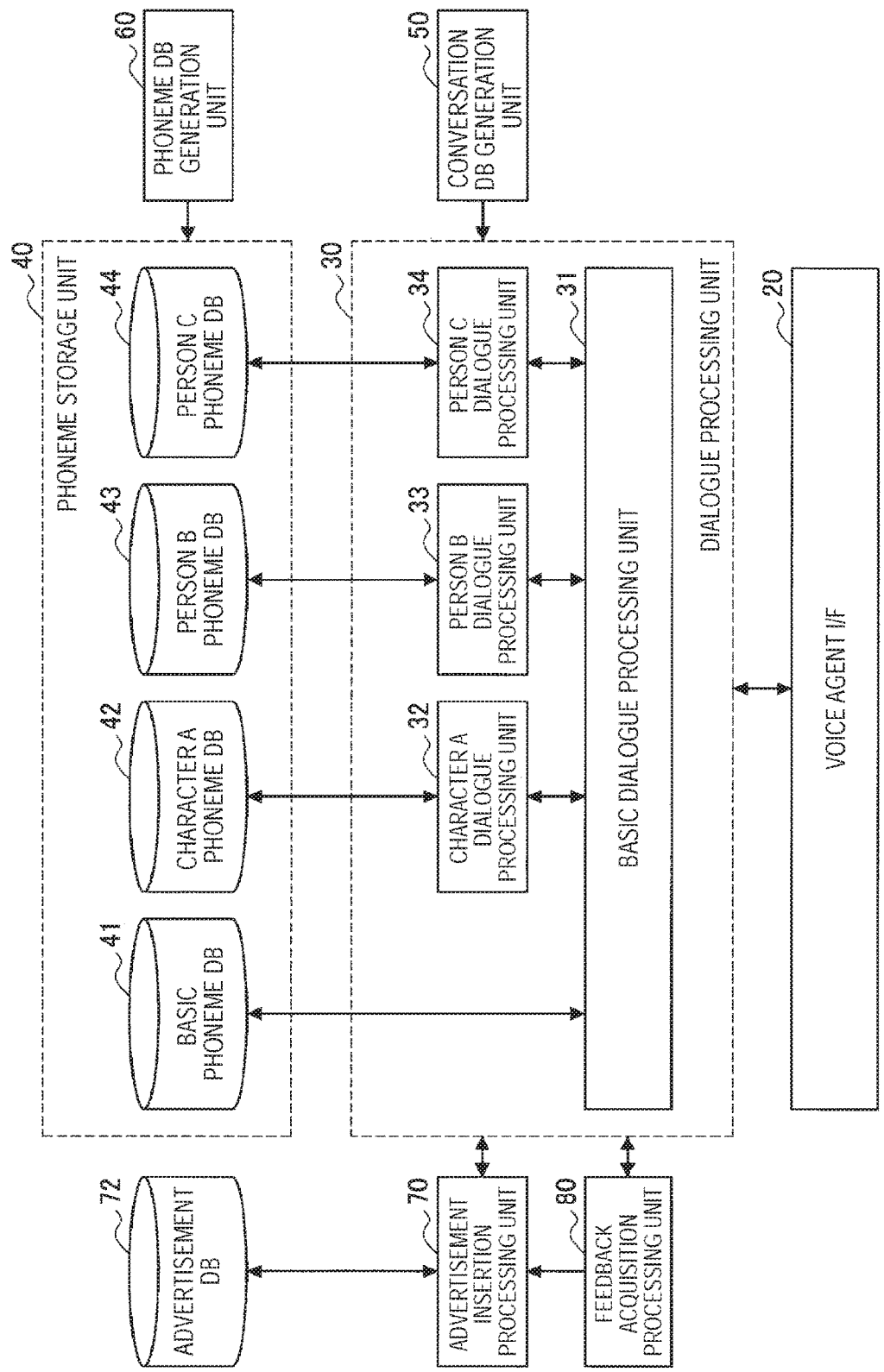
FIG. 3 is a block diagram illustrating an example of a configuration of a voice agent server according to the embodiment.

FIG. 3 is a block diagram illustrating an example of the configuration of the agent server 2 according to the embodiment. As illustrated in FIG. 3, the agent server 2 includes a voice agent interface (I/F) 20, a dialogue processing unit 30, a phoneme storage unit 40, a conversation DB generation unit 50, a phoneme DB generation unit 60, an advertisement insertion processing unit 70, an advertisement DB 72, and a feedback acquisition processing unit 80.

The voice agent IN 20 functions as an input and output unit, a voice recognition unit, and a voice generation unit for voice data. As the input and output unit, a communication unit that transmits and receives data to and from the client terminal 1 via the network 3 is assumed. The voice agent I/F 20 can receive the spoken voice of the user from the client terminal 1, process the voice, and convert the spoken voice into text through voice recognition. In addition, the voice agent I/F 20 processes answer sentence data (text) of the agent output from the dialogue processing unit 30 to vocalize answer voice using phoneme data corresponding to the agent and transmits the generated answer voice of the agent to the client terminal 1.

The dialogue processing unit 30 functions as an arithmetic processing device and a control device and controls overall operations in the agent server 2 in accordance with various programs. The dialogue processing unit 30 is realized by, for example, an electronic circuit such as a central processing unit (CPU) or a microprocessor. In addition, the dialogue processing unit 30 according to the embodiment functions as a basic dialogue processing unit 31, a character A dialogue processing unit 32, a person B dialogue processing unit 33, and a person C dialogue processing unit 34.

The character A dialogue processing unit 32, the person B dialogue processing unit 33, and the person C dialogue processing unit 34 realize dialogue specialized for each agent. Herein, examples of the agent include a "character A," a "person B," and a "person C" and the embodiment is, of course, not limited thereto. Each dialogue processing unit realizing dialogue specialized for many agents may be further included. The basic dialogue processing unit 31 realizes general-purpose dialogue not specialized for each agent.

Herein, a basic configuration common to the basic dialogue processing unit 31, the character A dialogue processing unit 32, the person B dialogue processing unit 33, and the person C dialogue processing unit 34 will be described with reference to FIG. 4.

Figure 4:
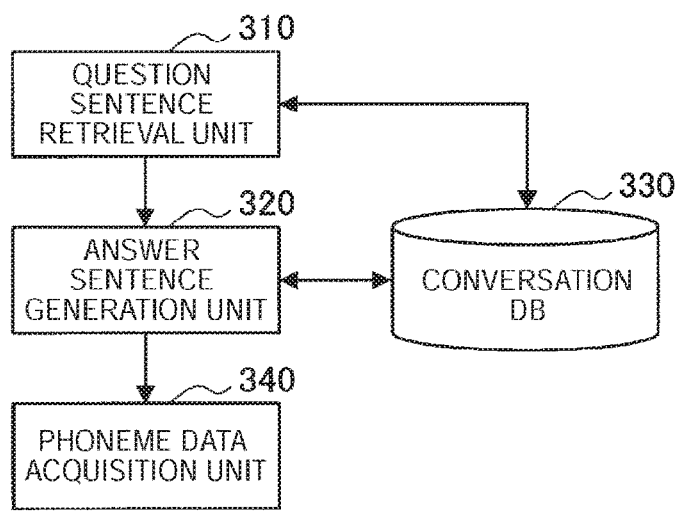
FIG. 4 is a diagram illustrating an example of a configuration of a dialogue processing unit according to the embodiment.

FIG. 4 is a diagram illustrating an example of a configuration of the dialogue processing unit 300 according to the embodiment. As illustrated in FIG. 4, the dialogue processing unit 300 includes a question sentence retrieval unit 310, an answer sentence generation unit 320, a phoneme data acquisition unit 340, and a conversation DB 330. The conversation DB 330 stores CONVERSATION data in which question sentence data and answer sentence data are paired. In the dialogue processing unit specialized for the agent, conversation data specialized for the agent is stored in the conversation DB 330. In a general-purpose dialogue processing unit, general-purpose data (that is, basic conversation data) not specific to the agent is stored in the conversation DB 330.

The question sentence retrieval unit 310 recognizes question voice (which is an example of spoken voice) of the user output from the voice agent I/F 20 and retrieves question sentence data matching the question sentence converted into text from the conversation DB 330. The answer sentence generation unit 320 extracts the answer sentence data stored in association with the question sentence data retrieved by the question sentence retrieval unit 310 from the conversation DB 330 and generates the answer sentence data. The phoneme data acquisition unit 340 acquires phoneme data for vocalizing an answer sentence generated by the answer sentence generation unit 320 from the phoneme storage unit 40 of the corresponding agent. For example, in the case of the character A dialogue processing unit 32, phoneme data for reproducing answer sentence data through the voice of the character A is acquired from the character A phoneme DB 42. Then, the dialogue processing unit 300 outputs the generated answer sentence data and the acquired phoneme data to the voice agent I/F 20.

The phoneme storage unit 40 stores a phoneme database for generating voice of each agent. The phoneme storage unit 40 can be realized by a read-only memory (ROM) and a random access memory (RAM). In the example illustrated in FIG. 3, a basic phoneme DB 41, a character A phoneme DB 42, a person B phoneme DB 43, and a person C phoneme DB 44 are stored. In each phoneme DB, for example, a phoneme segment and a prosodic model which is control information for the phoneme segment are stored as phoneme data.

The conversation DB generation unit 50 has a function of generating the conversation DB 330 of the dialogue processing unit 300. For example, the conversation DB generation unit 50 collects assumed question sentence data, collects answer sentence data corresponding to each question, and subsequently pairs and stores the question sentence data and the answer sentence data. Then, when a predetermined number of pieces of conversation data (pairs of question sentence data and answer sentence data: for example, 100 pairs) are collected, the conversation DB generation unit 50 registers the conversation data as a set of conversation data of the agent in the conversation DB 330.

The phoneme DB generation unit 60 has a function of generating the phoneme DB stored in the phoneme storage unit 40. For example, the phoneme DB generation unit 60 analyzes voice information of predetermined read text, decomposes the voice information into the phoneme segment and the prosodic model which is control information, and performs a process of registering a predetermined number or more of pieces of voice information as phoneme data in the phoneme DB when the predetermined number or more of pieces of voice information are collected.

The advertisement insertion processing unit 70 has a function of inserting advertisement information into dialogue of the agent. The advertisement information to be inserted can be extracted from the advertisement DB 72. In the advertisement DB 72, advertisement information (for example, information such as advertisement content of text, an image, voice, or the like, an advertiser, an advertisement period, and an advertisement target person) requested by a supply side such as a company (a vendor or a supplier) is registered.

The feedback acquisition processing unit 80 has a function of inserting a question for acquiring feedback into dialogue of the agent and obtaining the feedback from the user.

The configuration of the agent server 2 according to the embodiment has been described specifically above. Note that the configuration of the agent server 2 according to the embodiment is not limited to the example illustrated in FIG. 3. For example, each configuration of the agent server 2 may be achieved by another server on a network.

Next, a basic operation process of the communication control system according to the embodiment will be described with reference to FIGS. 5 to 14.

3. SYSTEM OPERATION PROCESS

<3-1. Conversation Data Registration Process>

Figure 5:
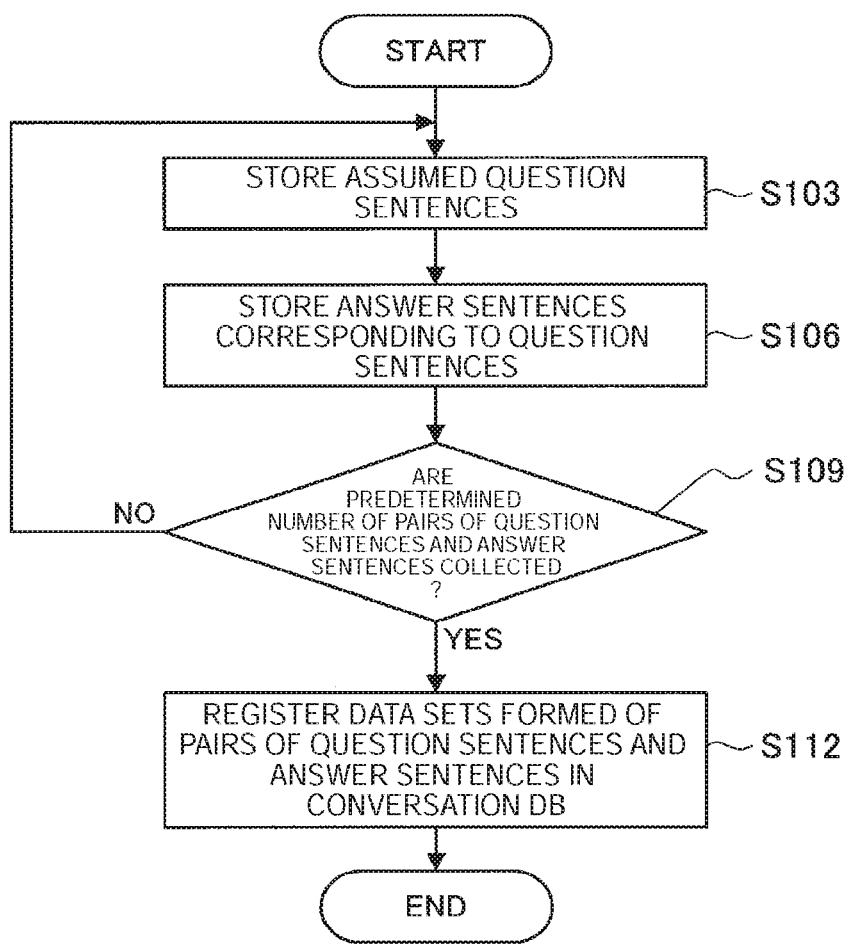
FIG. 5 is a flowchart illustrating a conversation DB generation process according to the embodiment.

FIG. 5 is a flowchart illustrating the conversation DB generation process 330 according to the embodiment. As illustrated in FIG. 5, the conversation DB generation unit 50 first stores assumed question sentences (step S103).

Subsequently, the conversation DB generation unit 50 stores answer sentences corresponding to (paired with) the question sentences (step S106).

Subsequently, the conversation DB generation unit 50 determines whether a predetermined number of pairs of question sentences and answer sentences (also referred to as conversation data) are collected (step S109).

Then, in a case in which the predetermined number of pairs of question sentences and conversation sentences are collected (Yes in step S109), the conversation DB generation unit 50 registers the data sets formed of many pairs of question sentences and answer sentences in the conversation DB 330 (step S112). As examples of the pairs of question sentences and answer sentences, for example, the following pairs are assumed.

Examples of pairs of question sentences and answer sentences

Pair 1

Question sentence: Good morning.

Answer sentence: How are you doing today?

Pair 2

Question sentence: How's the weather today?

Answer sentence: Today's weather is 00.

The pairs can be registered as conversation data in the conversation DB 330.

<3-2. Phoneme DB Generation Process>

Figure 6:
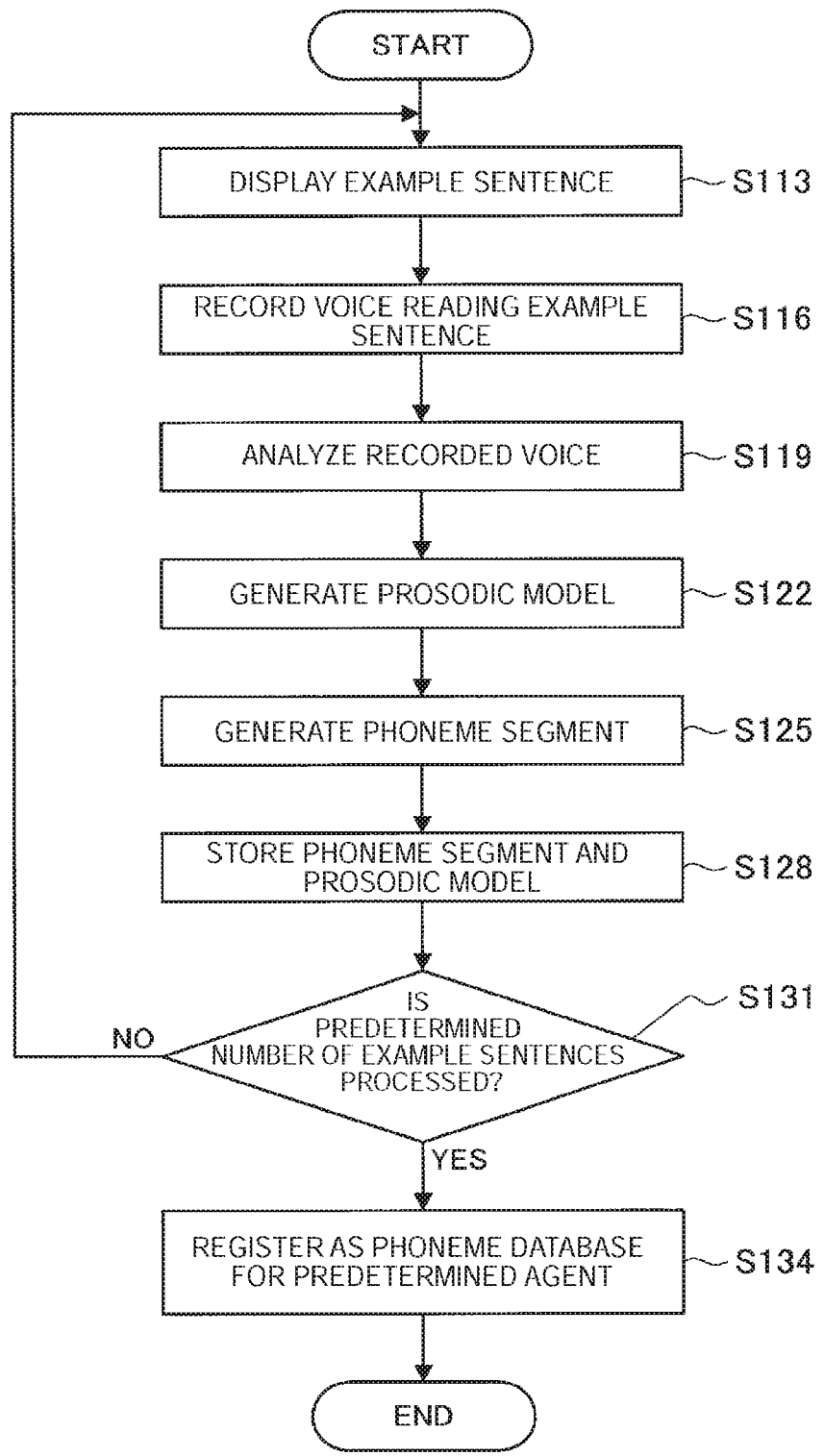
FIG. 6 is a flowchart illustrating a phoneme DB generation process according to the embodiment.

FIG. 6 is a flowchart illustrating a phoneme DB generation process according to the embodiment. As illustrated in FIG. 6, the phoneme DB generation unit 60 first displays an example sentence (step S113). In the display of the example sentence, for example, an example sentence necessary to generate phoneme data is displayed on a display of an information processing terminal (not illustrated).

Subsequently, the phoneme DB generation unit 60 records voice reading the example sentence (step S116) and analyzes the recorded voice (step S119). For example, voice information read by a person who takes charge of the voice of an agent is collected by the microphone of the information processing terminal. Then, the phoneme DB generation unit 60 receives and stores the voice information and further performs voice analysis.

Subsequently, the phoneme DB generation unit 60 generates a prosodic model on the basis of the voice information (step S122). The prosodic model extracts prosodic parameters indicating prosodic features of the voice (for example, a tone of the voice, strength of the voice, and a speech speed) and differs for each person.

Subsequently, the phoneme DB generation unit 60 generates a phoneme segment (phoneme data) on the basis of the voice information (step S125).

Subsequently, the phoneme DB generation unit 60 stores the prosodic model and the phoneme segment (step S128).

Subsequently, the phoneme DB generation unit 60 determines whether a predetermined number of the prosodic models and the phoneme segments are collected (step S131).

Then, in a case in which the predetermined number of prosodic models and phoneme segments are collected (Yes in step S131), the phoneme DB generation unit 60 registers the prosodic models and the phoneme segments as a phoneme database for a predetermined agent in the phoneme storage unit 40 (step S134).

<3-3. Dialogue Control Process>

Figure 7:
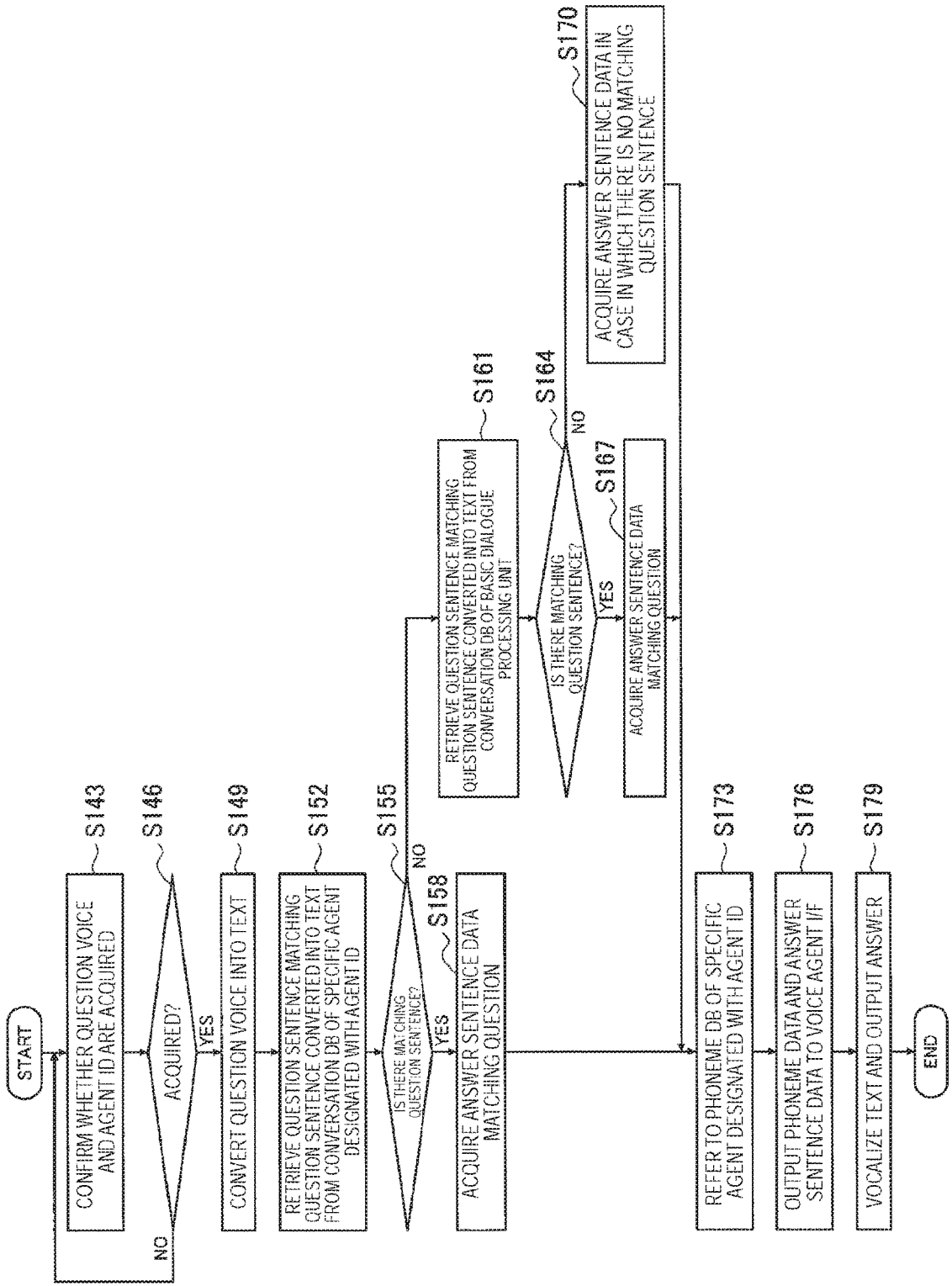
FIG. 7 is a flowchart illustrating a dialogue control process according to the embodiment.

FIG. 7 is a flowchart illustrating a dialogue control process according to the embodiment. As illustrated in FIG. 7, the voice agent I/F 20 first confirms whether question voice and an agent ID of a user are acquired (step S143). The agent ID is identification information indicating a specific agent such as the character A, the person B, or the person C. The user can purchase phoneme data of each agent. For example, an ID of the agent purchased in a purchase process is stored in the client terminal 1.

Subsequently, when the question voice and the agent ID of the user are acquired (Yes in step S146), the voice agent I/F 20 converts the question voice into text through voice recognition (step S149). The voice agent I/F 20 outputs the question sentence converted into text to the dialogue processing unit of the specific agent designated with the agent ID. For example, in the case of "agent ID: agent A" the voice agent I/F 20 outputs the question sentence converted into text to the character A dialogue processing unit 32.

Subsequently, the dialogue processing unit 30 retrieves a question sentence matching the question sentence converted into text from the conversation DB of the specific agent designated with the agent ID (step S152).

Subsequently, in a case in which there is a matching question (Yes in step S155), the character A dialogue processing unit 32 acquires answer sentence data corresponding to (paired with and stored) the question from the conversation DB of the specific agent (step S158)

Conversely, in a case in which there is no matching question (No in step S155), a question sentence matching the question sentence converted into text is retrieved from the conversation DB of the basic dialogue processing unit 31 (step S161).

In a case in which there is a matching question sentence (Yes in step S161), the basic dialogue processing unit 31 acquires the answer sentence data corresponding to (paired with and stored) the question from the conversation DB of the basic dialogue processing unit 31 (step S167).

Conversely, in a case in which there is no matching question (No in step S164), the basic dialogue processing unit 31 acquires answer sentence data (for example, an answer sentence "I don't understand the question") in a case in which there is no matching question sentence (step S170).

Subsequently, the character A dialogue processing unit 32 acquires phoneme data of the character A for generating voice of the answer sentence data with reference to the phoneme DB (herein, the character A phoneme DB 42) of the specific agent designated with the agent ID (step S173).

Subsequently, the acquired phoneme data and answer sentence data are output to the voice agent I/F 20 (step S176).

Then, the voice agent I/F 20 vocalizes the answer sentence data (text) (voice synthesis) using the phoneme data and transmits the answer sentence data to the client terminal 1 (step S179). The client terminal 1 reproduces the answer sentence through the voice of the character A.

<3-4. Conversation DB Updating Process>

Next, a process of updating the conversation DB 330 of each dialogue processing unit 300 will be described. In the embodiment, it is possible to extend the conversation DB 330 by a conversation with a user.

Figure 8:
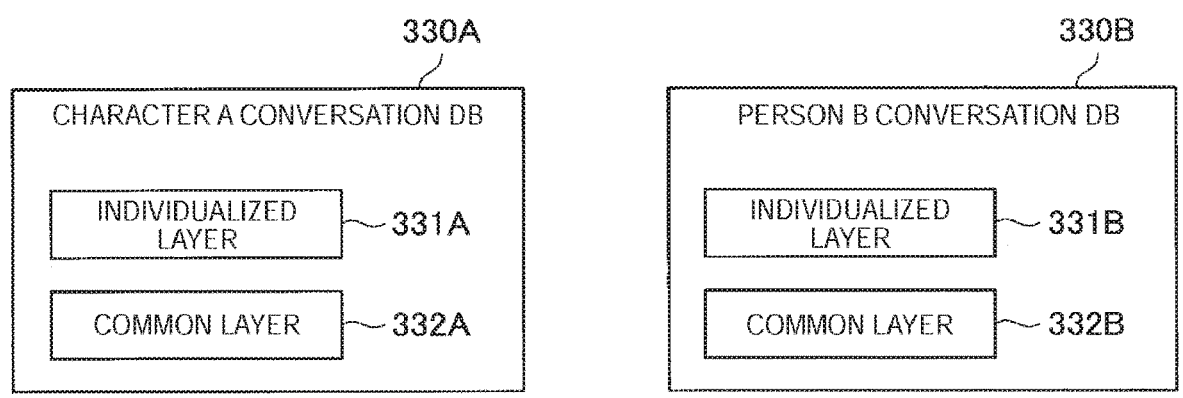
FIG. 8 is an explanatory diagram illustrating a data configuration example of the conversation DB according to the embodiment.

First, a data configuration example of the conversation DB 330 will be described supplementarily with reference to FIG. 8. FIG. 8 is an explanatory diagram illustrating a data configuration example of the conversation DB 330 according to the embodiment. As illustrated in FIG. 8, each conversation DB 330 includes two layers, an individualized layer 331 and a common layer 332. For example, in the case of a character A conversation DB 330A, conversation data in which personality or a feature of the character A is reflected is retained in the common layer 332A. On the other hand, in an individualized layer 331A, conversation data customized only for a user through a conversation with the user is retained. That is, the character A phoneme DB 42 and the character A dialogue processing unit 32 are supplied (sold) as a set to users. Then, certain users X and Y perform dialogues with the same character A at first (conversation data retained in the common layer 332A is used). However, as the dialogues continue, conversation data customized only for each user is accumulated in the individualized layer 331A for each user. In this way, it is possible to supply the users X and Y with dialogues with the character A in accordance with preferences of the users X and Y.

In addition, even in a case in which the agent "person B" is an average person of each generation who has no specific personality such as the character A, the conversation data can be customized only for the user. That is, for example, in a case in which the "person B" is a "person in his or her twenties," average conversation data of his or her twenties is retained in the common layer 332B and dialogue with the user is continued so that the customized conversation data is retained in the individualized layer 331B of each user. As dialogues with the user continue, customized conversation data is retained in the individualized layer 331B for each user. In addition, the user can also select favorite phoneme data such as "male," "female," "high-tone voice," or "low-tone voice" as the voice of the person B from the person B phoneme DB 43 and can purchase the favorite phoneme data.

Figure 9:
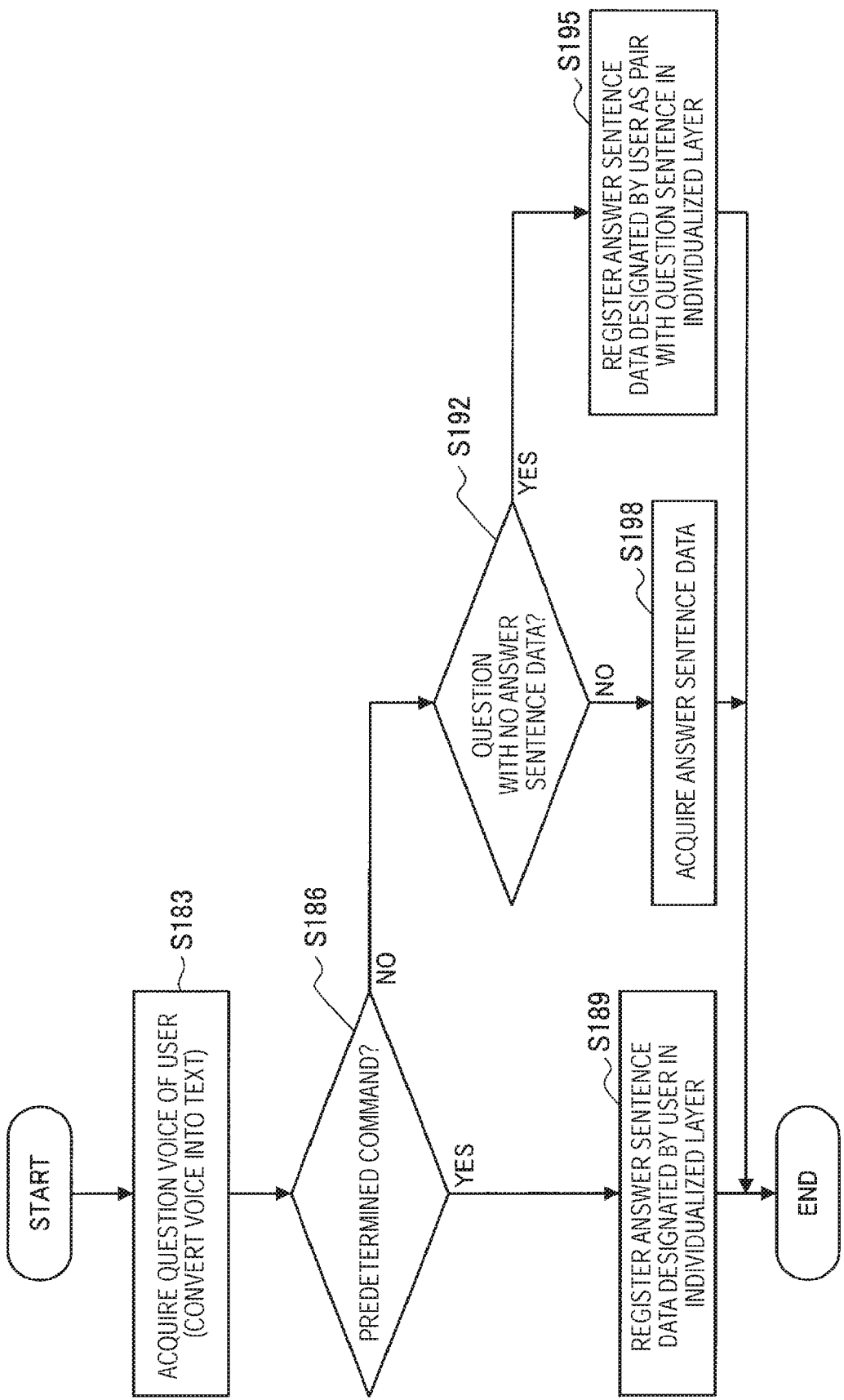
FIG. 9 is a flowchart illustrating a process of updating the conversation DB according to the embodiment.

A specific process at the time of the customization of the conversation DB 330 will be described with reference to FIG. 9. FIG. 9 is a flowchart illustrating a process of updating the conversation DB 330 according to the embodiment.

As illustrated in FIG. 9, the voice agent I/F 20 first acquires (receives) question voice of the user from the client terminal 1 and converts the question voice into text through voice recognition (step S183) The data (question sentence data) converted into text is output to the dialogue processing unit (herein, for example, the character A dialogue processing unit 32) of the specific agent designated by the agent ID.

Subsequently, the character A dialogue processing unit 32 determines whether the question sentence data is a predetermined command (step S186).

Subsequently, in a case in which the question sentence data is the predetermined command (Yes in step S186), the character A dialogue processing unit 32 registers answer sentence data designated by the user as a pair with the question sentence data in the individualized layer 331A of the conversation DB 330A (step S189). The predetermined command may be, for example, a word "NG" or "Setting." For example, the conversation DB of the character A can be customized in accordance with a flow of the following conversation.

User: "Good morning"
Character A: "Good morning"
User: "NG Answer to fine do your best"
Character A: "Fine do your best"

In the flow of the foregoing conversation, "NG" is the predetermined command. After "NG" is spoken by the user, the character A dialogue processing unit 32 registers answer sentence data "Fine do your best" designated by the user as a pair with the question sentence data "Good morning" in the individualized layer 331A of the conversation DB 330A.

Conversely, in a case in which the question sentence data is not the predetermined command (No in step S186), the character A dialogue processing unit 32 retrieves the answer sentence data retained as the pair with the question sentence data from the character A conversation DB 330A. In a case in which the answer sentence data retained as the pair with the question sentence data is not retained in the character A conversation DB 330A, that is, a question of the user is a question with no answer sentence (Yes in step S192), the character A dialogue processing unit 32 registers the answer sentence data designated by the user as a pair with the question sentence in the individualized layer 331A (step S195). For example, in a flow of the following conversation, the conversation DB of the character A can be customized.

User A: "Fine?"

Character A: "I can't understand the question" (answer data example in case in which there is no corresponding answer)

User: "When I questions "Fine?," answer to "Fine today""

Character A: "Fine today"

In the flow of the foregoing conversation, since there is no answer sentence data maintained to be paired with "Fine?," "I can't understand the question" which is an example of the answer data in the case in which there is no corresponding answer is acquired by the character A dialogue processing unit 32, is output along with corresponding phoneme data of the character A to the voice agent I/F 20, and is reproduced in the client terminal 1. Subsequently, when the answer sentence "Fine today" designated by the user is input, the character A dialogue processing unit 32 registers "Fine today" as the pair with the question sentence data "Fine?" in the individualized layer 331A.

Conversely, in a case in which the question of the user is a question for which there is an answer sentence (No in step S192), the character A dialogue processing unit 32 acquires the answer sentence data and outputs the answer sentence data along with the corresponding phoneme data of the character A to the voice agent I/F 20. Then, the answer sentence is reproduced through the voice of the character A in the client terminal 1 (step S198).

Figure 10:
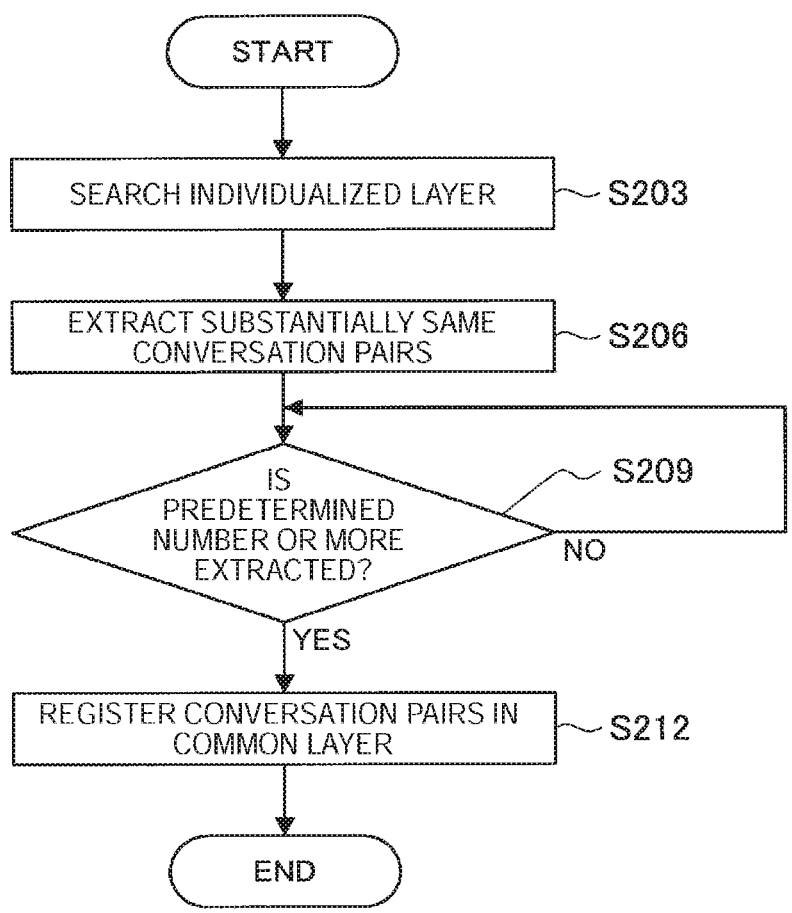
FIG. 10 is a flowchart illustrating a conversation data transition process from an individualized layer to a common layer according to the embodiment.

Next, conversation data transition from an individualized layer to a common layer will be described with reference to FIG. 10. FIG. 10 is a flowchart illustrating conversation data transition process from an individualized layer to a common layer according to the embodiment. Herein, for example, the conversation data transition process from the individualized layer 331A to the common layer 332A of the character A dialogue processing unit 32 will be described.

As illustrated in FIG. 10, the character A dialogue processing unit 32 first searches the individualized layer 331A for each user periodically (step S203) and extracts conversation pairs with substantially the same content (the pair of question sentence data and answer sentence data) (step S206). For the conversation pairs with the substantially same content, for example, a pair of question sentence "Fine?" and answer sentence "Fine today!" and a pair of question sentence "Are you fine?" and answer sentence "Fine today!" can be determined to be the conversation pairs with substantially the same content because the question sentences are different only in a polite expression or not.

Subsequently, when a predetermined number or more of conversation pairs are extracted from the individualized layer 331A for each user (Yes in step S209), the character A dialogue processing unit 32 registers the conversation pairs in the common layer 332A (for each user) (step S212).

In this way, when the conversation pairs with substantially the same content in the individualized layer 331 for each user transition to the common layer 332, the common layer 332 can be extended (the conversation pairs can be expanded).

Figure 11:
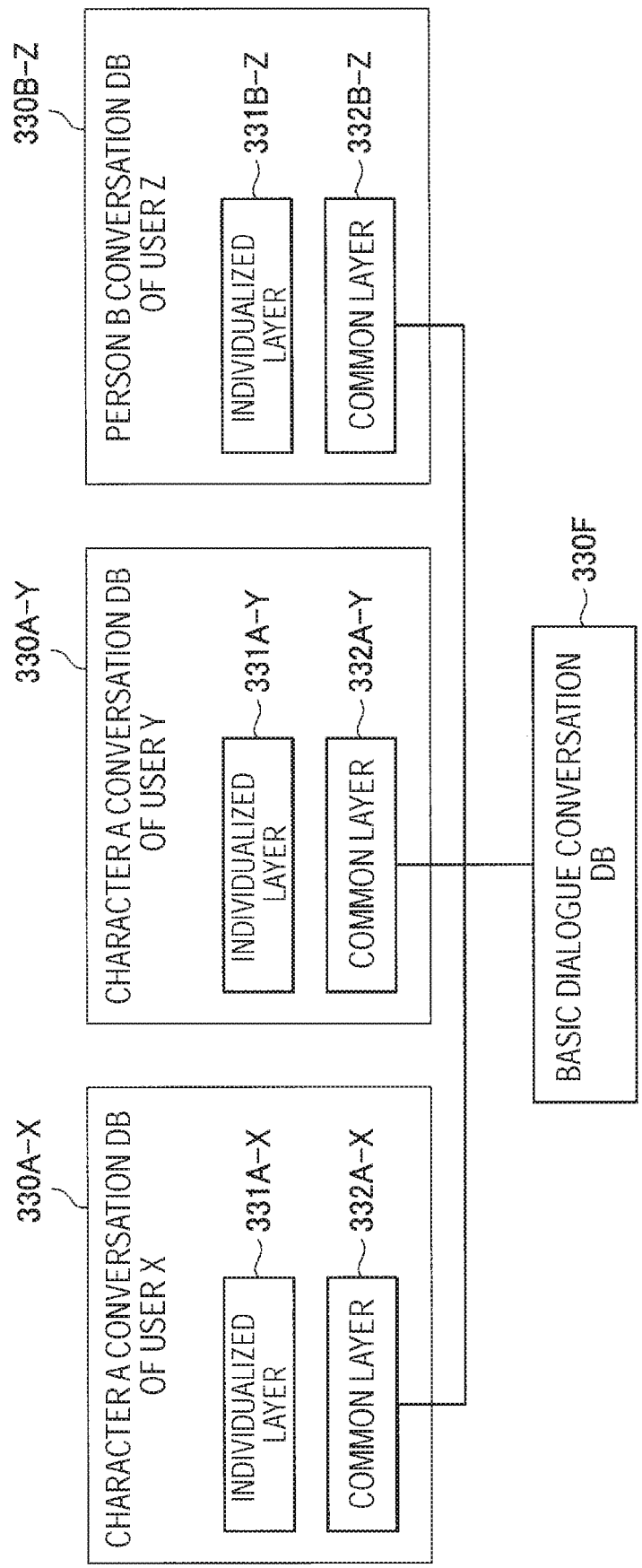
FIG. 11 is an explanatory diagram illustrating transition of conversation data to a basic dialogue conversation DB according to the embodiment.

In addition, in the embodiment, the conversation data can transition from the conversation DB (specifically, the common layer) of the specific agent to the basic dialogue conversation DB, and thus the basic dialogue conversation DB can also be extended. FIG. 11 is an explanatory diagram illustrating transition of conversation data to the basic dialogue conversation DB 330F according to the embodiment. For example, in a case in which the users X and Y each select (purchase) the agent "character A" and a user Z selects (purchases) the agent "person B," as illustrated in FIG. 11, a character A conversation DB 330A-X of the user X, a character A conversation DB 330A-Y of the user Y, and a person B conversation DB 330-Z of the user Z can be in the dialogue processing unit 30. In this case, in individualized layers 331A-X, 331A-Y, and 331B-Z, unique (customized) conversation pairs are gradually registered in accordance with dialogues with the users X, Y, and Z (see FIG. 9). Subsequently, when substantially the same conversation pairs in the same individualized layers 331A-X and 331A-Y become a predetermined number, substantially the same conversation pairs are registered in common layers 332A-X, 332A-Y for the users, respectively (see FIG. 10).

Figure 12:
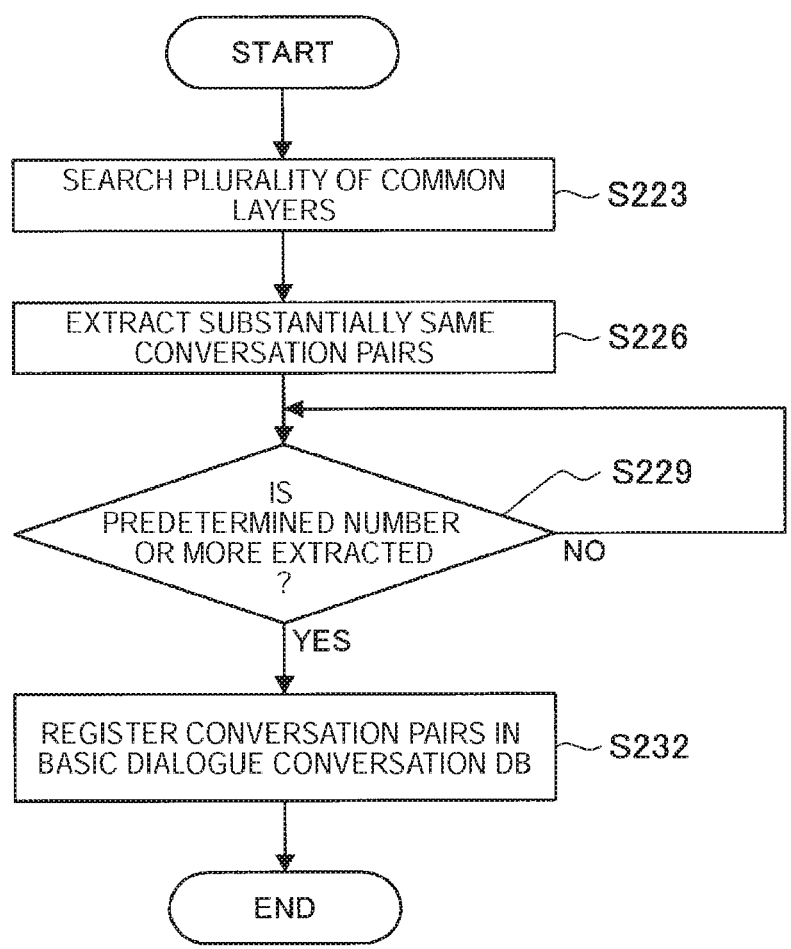
FIG. 12 is a flowchart illustrating a conversation data transition process to a basic dialogue DB according to the embodiment.

Then, in a case in which a predetermined number or more of substantially same conversation pairs are extracted from the common layers 332A-X, 332A-Y, and 332B-Z of the plurality of agents (which may include different agents), the dialogue processing unit 30 causes the conversation pairs to transition to a high-order basic dialogue conversation DB 330F. The basic dialogue conversation DB 330F is a conversation DB included in the basic dialogue processing unit 31. Thus, it is possible to extend the basic dialogue conversation DB 330F (expand the conversation pairs). The data transition process will be described specifically with reference to FIG. 12. FIG. 12 is a flowchart illustrating the conversation data transition process to the basic dialogue DB 330F according to the embodiment.

As illustrated in FIG. 12, the dialogue processing unit 30 first searches the plurality of common layers 332 of the conversation DBs 330 periodically (step S223) and extracts substantially the same conversation pairs (step S226).

Subsequently, when the predetermined number or more of substantially same conversation pairs are extracted from the plurality of common layers 332 (Yes in step S229), the dialogue processing unit 30 registers the conversation pairs in the basic dialogue conversation DB 330F (step S232).

In this way, by causing the conversation pairs with substantially the same content in the common layers 332 of the conversation DBs 330 in the plurality of agents to transition to the basic dialogue conversation DB 330F, it is possible to extend the basic dialogue conversation DB 330F (expand the conversation pairs).

<3-5. Advertisement Output Process>

Next, an advertisement information insertion process by the advertisement insertion processing unit 70 will be described with reference to FIGS. 13 and 14. In the embodiment, the advertisement insertion processing unit 70 can insert advertisement information stored in the advertisement DB 72 into speech of an agent. The advertisement information can be registered in advance in the advertisement DB 72. FIG. 13 is a diagram illustrating an example of advertisement information registered in the advertisement DB 72 according to the embodiment.

As illustrated in FIG. 13, advertisement information 621 includes, for example, an agent ID, a question sentence, advertisement content, a condition, and a probability. The agent ID designates an agent speaking advertisement content, the question sentence designates a question sentence of a user which serves as a trigger and into which advertisement content is inserted, and the advertisement content is an advertisement sentence inserted into dialogue of an agent. In addition, the condition is a condition on which advertisement content is inserted and the probability indicates a probability at which advertisement content is inserted. For example, in an example illustrated in the first row of FIG. 13, in a case in which a word "chocolate" is included in a question sentence from a user who is 30 years old or less in dialogue with the agent "character A," advertisement content "chocolate newly released by "BB company is delicious because milk is contained much" is inserted into the question sentence. In addition, when the advertisement content is inserted every time at the time of speaking the question sentence serving as a trigger, the user feels troublesome. Therefore, in the embodiment, a probability at which the advertisement is inserted may be set. The probability may be decided in accordance with advertisement charges. For example, the probability is set to be higher as the advertisement charges are higher.

The advertisement content insertion process will be described specifically with reference to FIG. 14. FIG. 14 is a flowchart illustrating the advertisement content insertion process according to the embodiment.

Figure 14:
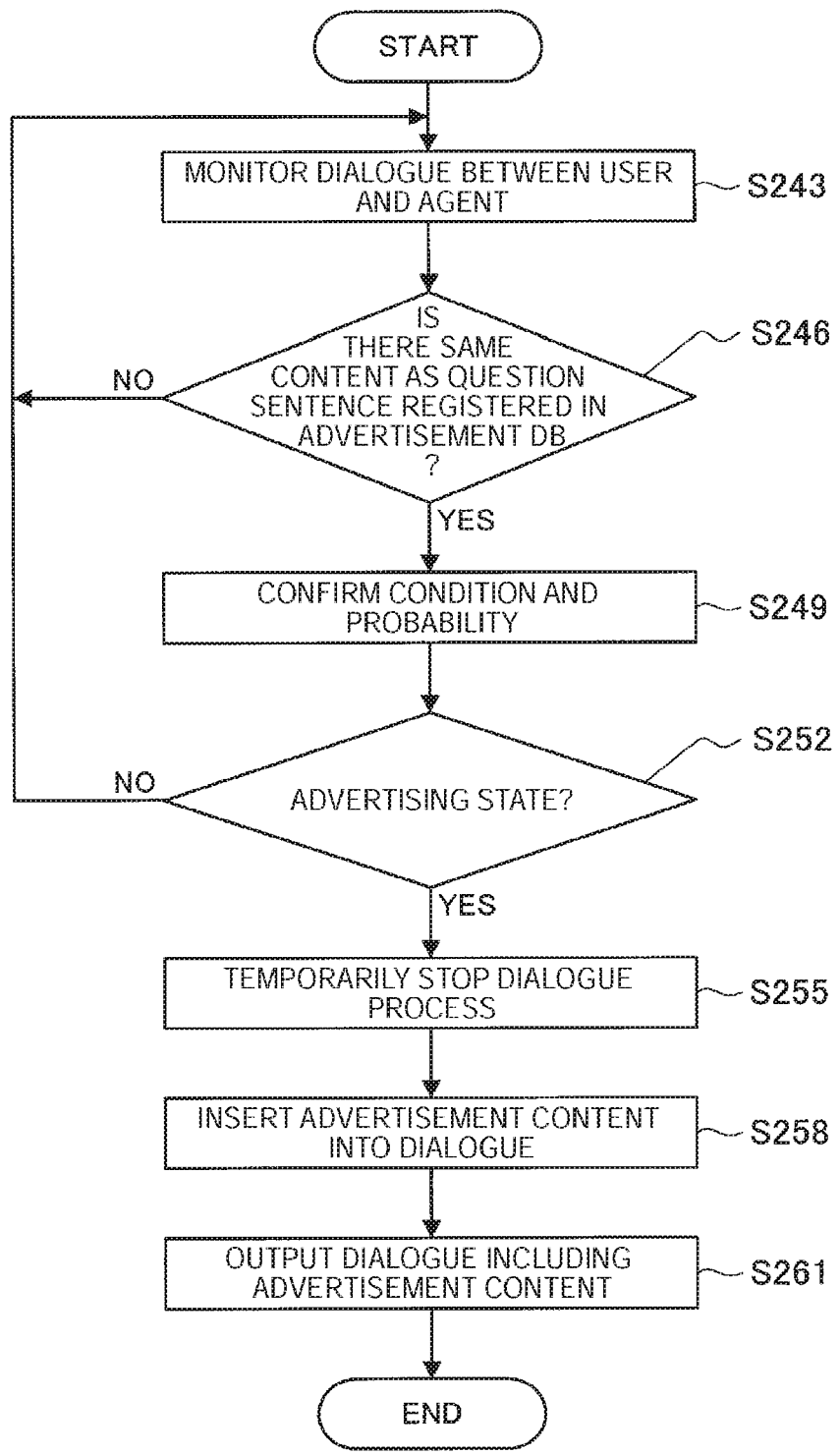
FIG. 14 is a flowchart illustrating an advertisement content insertion process according to the embodiment.

As illustrated in FIG. 14, the advertisement insertion processing unit 70 first monitors dialogue (specifically, a dialogue process by the dialogue processing unit 30) between the user and the agent (step S243).

Subsequently, the advertisement insertion processing unit 70 determines whether a question sentence with the same content as a question sentence registered in the advertisement DB 72 appears in the dialogue between the user and the agent (step S246).

Subsequently, in a case in which the question sentence with the same content appears (Yes in step S246), the advertisement insertion processing unit 70 confirms the condition and the probability of the advertisement insertion associated with the corresponding question sentence (step S249).

Subsequently, the advertisement insertion processing unit 70 determines whether a current state is an advertising state on the basis of the condition and the probability (step S252).

Subsequently, in a case in which the current state is the advertising state (Yes in step S252), the advertisement insertion processing unit 70 temporarily interrupts the dialogue process by the dialogue processing unit 30 (step S255) and inserts the advertisement content into the dialogue (step S258). Specifically, for example, the advertisement content is inserted into an answer sentence of the agent for the question sentence of the user.

Then, the dialogue (conversation sentence data) including the advertisement content is output from the dialogue processing unit 30 to the voice agent I/F 20, is transmitted from the voice agent I/F 20 to the client terminal 1, and is reproduced through voice of the agent (step S261). Specifically, for example, the advertisement content can be presented as a speech of the character A to the user, for example, in the following conversation.

User: "Good morning"
Character A: "Good morning! How are you doing today?"
User: "Fine. I want to eat some delicious food"
Character A: "I heard that grilled meat at CC store is delicious"

In the conversation, the corresponding answer sentence "Good morning! How are you doing today?" retrieved from the conversation DB of the character A is first output as voice in response to the question sentence "Good Morning" of the user. Subsequently, since the question sentence "I want to eat some delicious food" serving as the trigger of the advertisement insertion is included in the question sentence "Fine. I want to eat some delicious food" of the user (see second row of FIG. 13), the advertisement insertion processing unit 70 performs the advertisement insertion process and outputs the answer sentence with the advertisement content "I heard that grilled meat at CC store is delicious" through the voice of the character A.

The conversation data registration process, the phoneme DB generation process, the dialogue control process, the conversation DB updating process, and the advertisement insertion process have been described above as the basic operation processes of the communication control system according to the embodiment.

(Supplement)

Figure 15:
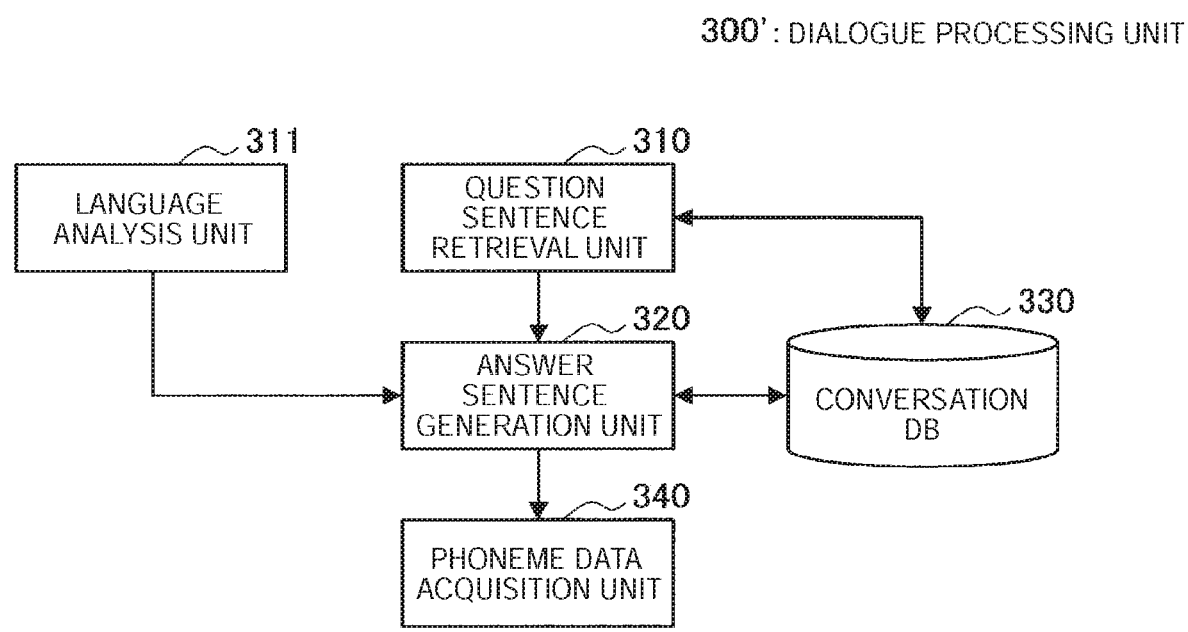
FIG. 15 is a diagram illustrating a configuration of a dialogue processing unit according to an application example of the embodiment.

Note that the configuration of the dialogue processing unit 300 according to the embodiment is not limited to the example illustrated in FIG. 4. FIG. 15 is a diagram illustrating a configuration of a dialogue processing unit 300' according to an application example of the embodiment. As illustrated in FIG. 15, the dialogue processing unit 300' is different from the configuration example illustrated in FIG. 4 in that a language analysis unit 311 is further included. The language analysis unit 311 performs language analysis of question sentence data of the user converted into text through the voice agent I/F 20 to analyze a command. The answer sentence generation unit 320 generates answer sentence data in accordance with the command analyzed by the language analysis unit 311. In addition, in response to the command analyzed by the language analysis unit 311, the dialogue processing unit 300' controls each configuration of the agent server 2 such that a process in accordance with the command is performed. For example, in the case of a command to transmit a message, the dialogue processing unit 300' generates answer sentence data in response to a request for transmitting a message from the user and further outputs the message to be transmitted to a predetermined destination to the voice agent I/F in accordance with a messenger function performed by a message transmission and reception control unit 701 to be described below.

In addition, the advertisement insertion process according to the embodiment is not limited to the above-described example. The advertisement insertion processing unit 70 according to the embodiment can arouse a potential request of the user and present more effective advertisement information. Hereinafter, the advertisement insertion process will be described specifically with reference to FIGS. 16 to 23.

4. ADVERTISEMENT INSERTION PROCESS

<4-1. Configuration>

Figure 16:
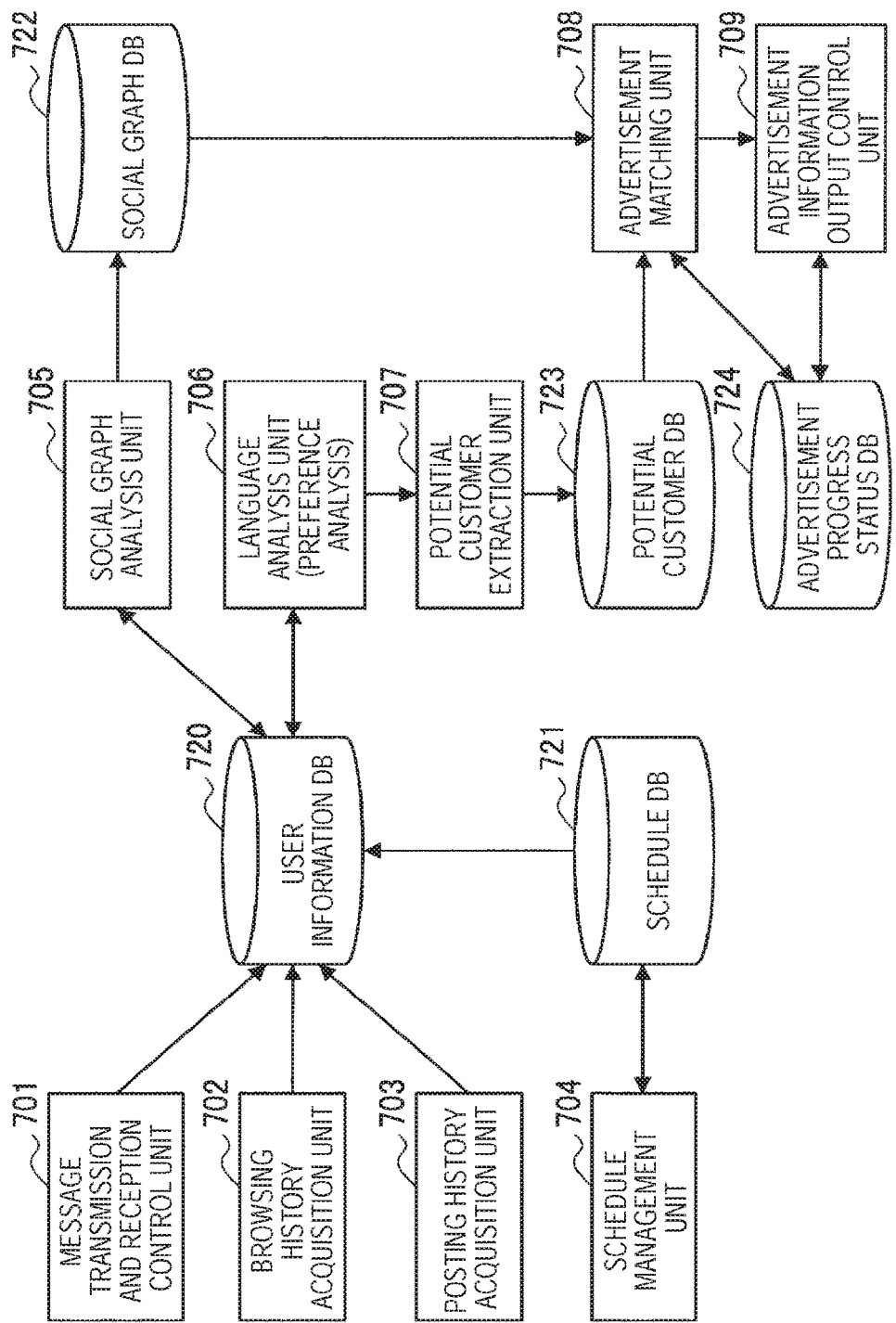
FIG. 16 is a diagram illustrating an example of a configuration of an advertisement insertion processing unit according to the embodiment.

FIG. 16 is a diagram illustrating an example of a configuration of the advertisement insertion processing unit 70 according to the embodiment. As illustrated in FIG. 16, the advertisement insertion processing unit 70 includes a message transmission and reception control unit 701, a browsing history acquisition unit 702, a posting history acquisition unit 703, a schedule management unit 704, a social graph analysis unit 705, a language analysis unit 706, a potential customer extraction unit 707, an advertisement matching unit 708, an advertisement information output control unit 709, a user information DB 720, a schedule DB 721, a social graph DB 722, a potential customer DB 723, and an advertisement progress status DB 724.

The message transmission and reception control unit 701 realizes the messenger function and controls transmission and reception of a message between the client terminal 1 of the user and another device (for example, the client terminal 1 of another user). The message transmission and reception control unit 701 requests the dialogue processing unit 30 to give a response of the agent related to transmission and reception of the message, and answer voice related to the transmission and reception of the message is generated by the agent designated by the user in the dialogue processing unit 30 and the voice agent I/F and is reproduced in the client terminal 1. Control of the transmission and reception of the message will be described with reference to FIGS. 17 and 18.

The browsing history acquisition unit 702 acquires a browsing history of the Internet. For example, when the user requests the agent to browse the Internet with the client terminal 1, dialogue with the agent is controlled by the agent server 2. The browsing history acquisition unit 702 can monitor the dialogue processing unit 30 and acquire the browsing history of the Internet of the user.

The posting history acquisition unit 703 acquires a posting history of an image, voice, and text of the user on the Internet. For example, when the user performs posting (posting on SNS or the like) on the Internet with the client terminal 1 by giving a request to the agent, the dialogue with the agent is controlled by the agent server 2. The posting history acquisition unit 703 can monitor the dialogue processing unit 30 and acquire the posting history of the user on the Internet. Note that the posting history acquisition unit 703 can also access an SNS server and acquire the posting history.

The schedule management unit 704 manages schedule information of the user. Schedule information of each user is stored in the schedule DB 721. For example, when the user requests the agent to register and confirm a schedule with the client terminal 1, the dialogue with the agent is controlled by the agent server 2. The schedule management unit 704 manages the schedule of the user on the basis of the registration request or the confirming request for the schedule output from the dialogue processing unit 30.

Note that the message transmission and reception control unit 701, the browsing history acquisition unit 702, the posting history acquisition unit 703, the schedule management unit 704, and the schedule DB 721 described above may each be realized by an external independent server system.

The user information DB 720 extracts and accumulates user information (the use situation of the service or the client terminal of the user) such as the transmission and reception of the message by the user, the Internet browsing history of the user, the posting history of the user, and the schedule information of the user from the message transmission and reception control unit 701, the browsing history acquisition unit 702, the posting history acquisition unit 703, and the schedule DB 721. The user information can be accumulated daily.

The social graph analysis unit 705 analyzes an interaction relation of the user on the basis of the user information accumulated in the user information DB 720 and stores an analysis result (a social graph) in the social graph DB 722.

The language analysis unit 706 analyzes language analysis of the posting content and the message transmitted and received by the user from the user information DB 720 and analyzes preferences of the users.

The potential customer extraction unit 707 extracts potential customers (determines whether the users are the potential customers) on the basis of the preferences of the users analyzed through the language analysis by the language analysis unit 706. Then, the potential customer extraction unit 707 stores the information regarding the extracted potential customer in the potential customer DB 723.

The advertisement matching unit 708 performs matching of the potential customer information retained in the potential customer DB 723 with the advertisement information stored in the advertisement DB 72 and decides an advertisement to be presented to the potential customers. At this time, in a case in which usefulness of products is hit simultaneously by a plurality of users and goods gain popularity for the first time (for example, the goods are used in a group or joint purchase is set as a condition), the advertisement matching unit 708 can also confirm relation of the potential customers (whether there is interaction) with reference to the social graph DB 722 and perform matching of the plurality of potential customers with the advertisement information. In addition, the advertisement matching unit 708 registers a matching result in the advertisement progress status DB 724.

The advertisement information output control unit 709 performs control such that the advertisement information matched by the advertisement matching unit 708 is presented to the user. At this time, the advertisement information output control unit 709 first requests the dialogue processing unit 30 to reproduce a guidance message for arousing interest in the matched advertisement information as a speech of the agent through voice of the user with the client terminal 1. The advertisement information output control unit 709 updates a status of the advertisement progress status DB 724 in a case in which the guidance message is produced. Thereafter, the advertisement information output control unit 709 requests the dialogue processing unit 30 to present the advertisement information to the user through the voice of the agent at an appropriate timing. In this way, in the embodiment, since the guidance message is inserted into the dialogues of the agents of the potential customers of the advertised product and interest of the user in the advertised product is aroused, it is assumed that a hit rate of the advertisement can be raised by inserting the advertisement information into the dialogues of the agents for presentation. In addition, the advertisement information output control unit 709 updates the status of the advertisement progress status DB 724 even in a case in which the advertisement information is sent.

The configuration of the advertisement insertion processing unit 70 according to the embodiment has been described specifically above. Next, an operation process according to the embodiment will be described specifically with reference to FIGS. 17 to 23.

<4-2. Operation Process>

(4-2-1. Message Transmission and Reception Process)

Figure 17:
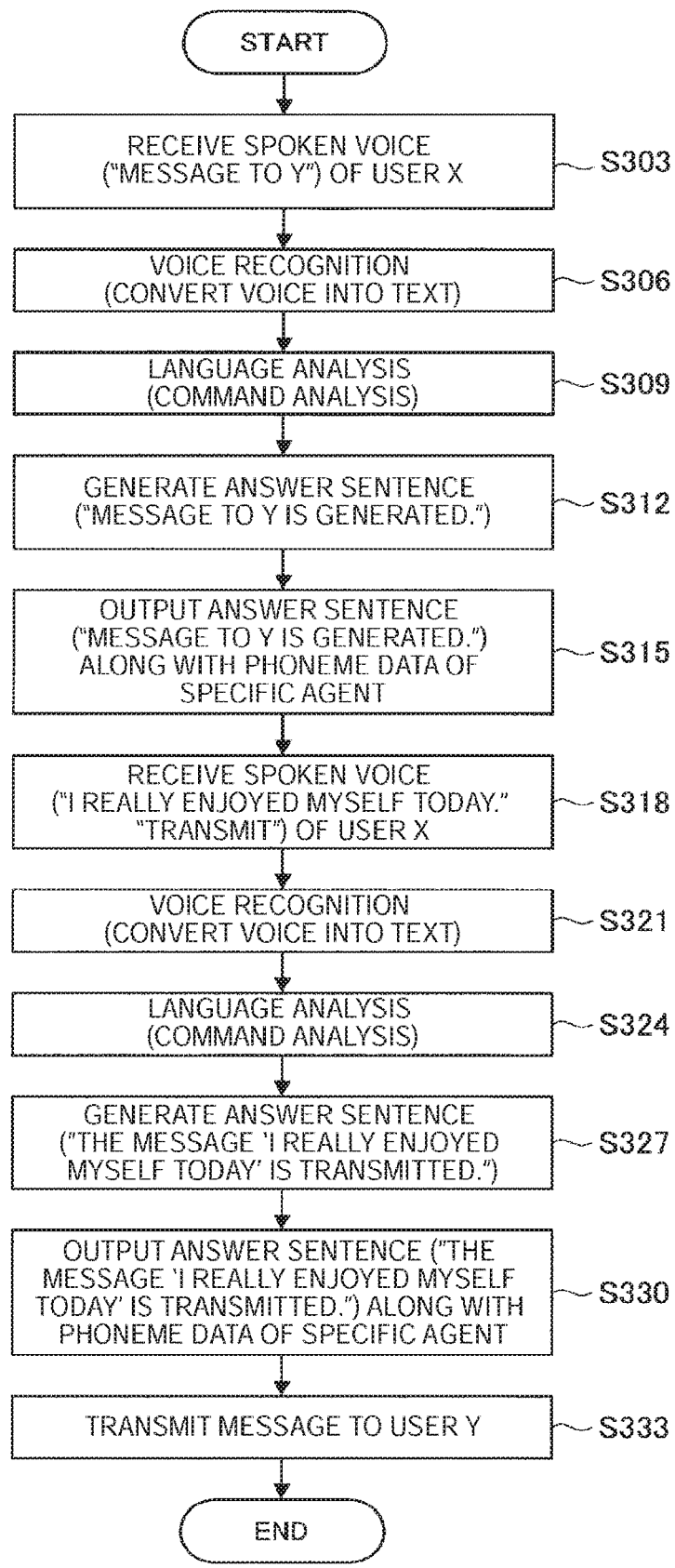
FIG. 17 is a flowchart illustrating a message transmission process according to the embodiment.

FIG. 17 is a flowchart illustrating a message transmission process according to the embodiment. The message transmission process is performed through the dialogue processing unit 30 by the message transmission and reception control unit 701. The dialogue processing unit 30 controls dialogue of the agent such that transmission and reception of a message is assisted under the control of the message transmission and reception control unit 701.

Specifically, as illustrated in FIG. 17, the voice agent I/F 20 of the agent server 2 first receives a spoken voice of the user X (for example, a message to the user Y) from the client terminal 1 of the user X (hereinafter referred to as a client terminal 1x) (step S303).

Subsequently, the voice agent IN 20 performs the voice recognition to convert a spoken voice (question sentence data) of the user X into text (step S306).

Subsequently, the voice agent I/F 20 outputs the question sentence data converted into text to the dialogue processing unit (for example, the character A dialogue processing unit 32) of the specific agent designated with the agent ID and the language analysis unit 311 of the dialogue processing unit 32 performs language analysis (command analysis: generation of the message) (step S309).

Subsequently, the answer sentence generation unit 320 generates an answer sentence data (for example, "A message to the user Y is generated.") in response to the command (step S312).

Subsequently, the phoneme data acquisition unit 340 acquires the phoneme data of the specific agent (for example, the character A) for vocalizing the answer sentence data) and outputs the phoneme data and the answer sentence data to the voice agent I/F 20 (step S315). The voice agent I/F 20 vocalizes the answer sentence data and transmits the answer sentence data to the client terminal 1x, and the answer sentence data is reproduced through the voice of the specific agent in the client terminal 1x.

Subsequently, the voice agent I/F 20 receives a transmission message voice (for example, "I really enjoyed myself today. Transmit.") input to the client terminal 1x by the user X from the client terminal 1x (step S318).

Subsequently, the voice agent I/F 20 performs voice recognition on the voice (the question sentence data) of the user X received from the client terminal 1x (converts voice into text) (step S321). The question sentence data converted into text is output to the dialogue processing unit (for example, the character A dialogue processing unit 32) of the specific agent.

Subsequently, the language analysis unit 311 performs language analysis (command analysis: transmission of the message) (step S324).

Subsequently, the answer sentence data (for example, "the message 'I really enjoyed myself today' is transmitted") in accordance with the command is generated (step S327).

Subsequently, the phoneme data of the specific agent (for example, the character A) for vocalizing the answer sentence data is acquired and the phoneme data and the answer sentence data are output to the voice agent I/F 20 (step S330). The voice agent I/F 20 vocalizes the answer sentence data and transmits the answer sentence data to the client terminal 1x, and the answer sentence data is reproduced through the voice of the specific agent in the client terminal 1x.

Subsequently, the voice agent I/F 20 transmits the message (for example, "1 really enjoyed myself today") converted into text and destined for the user Y to the client terminal 1 of the user Y (hereinafter referred to as a client terminally) under the control of the message transmission and reception control unit 701 (step S333).

Figure 18:
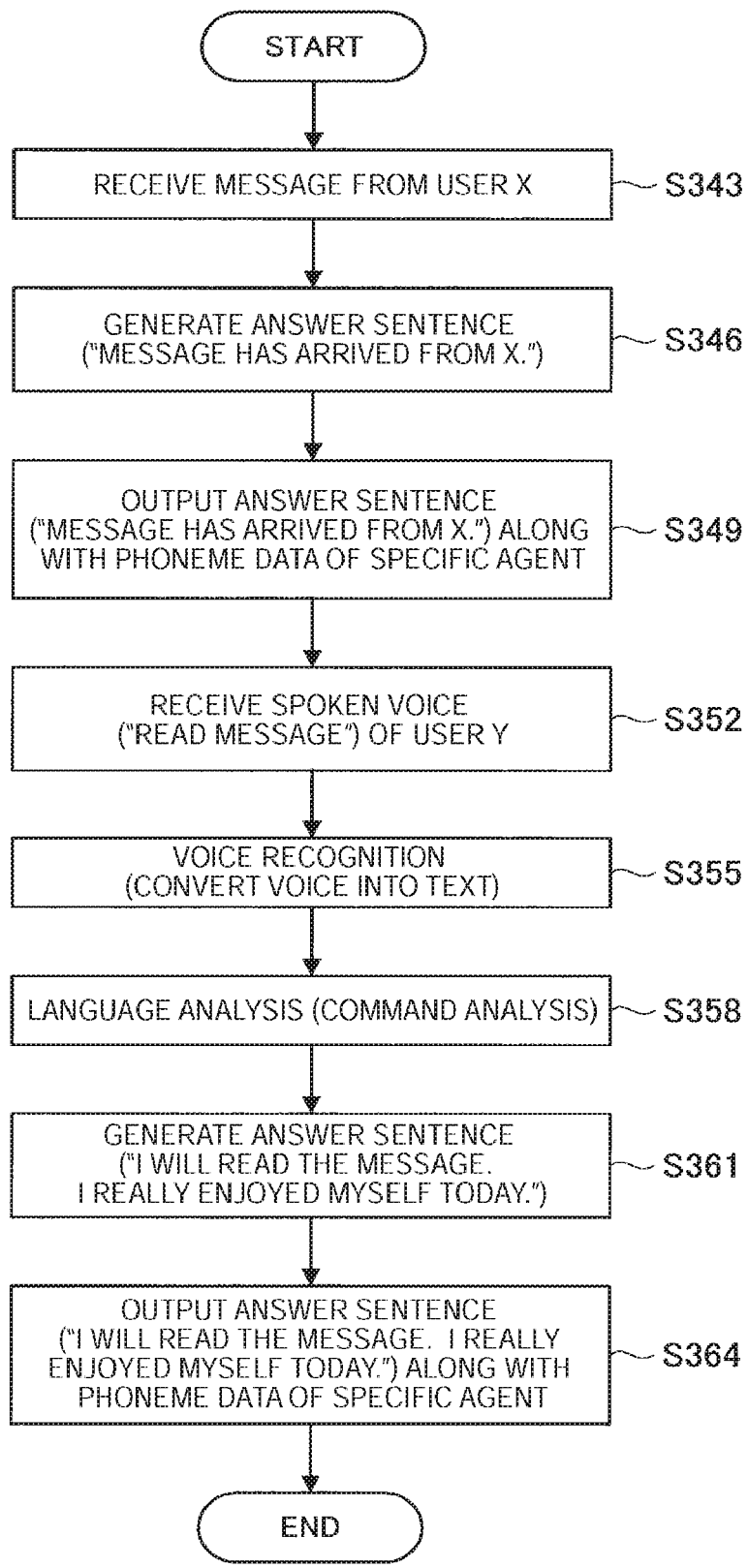
FIG. 18 is a flowchart illustrating a message reception process according to the embodiment.

Next, an operation process in a case in which a message is received will be described with reference to FIG. 18. FIG. 18 is a flowchart illustrating a message reception process according to the embodiment.

As illustrated in FIG. 18, the client terminal 1y of the user Y first receives a message from the user X via the agent server 2 (step S343). At this time, the message may be displayed on the client terminal 1y on a text basis. When the message is reproduced in a dialogue format of the agent, the following process is performed in the agent server 2.

Specifically, the answer sentence generation unit 320 of the dialogue processing unit (for example, the character A dialogue processing unit 32) of the agent ID designated by the user Y in the agent server 2 generates answer sentence data (for example, "A message has arrived from the user X") for notifying that the message is transmitted from the user X (step S346).

Subsequently, the answer sentence data is output along with the phoneme data of the specific agent from the dialogue processing unit 30 to the voice agent I/F 20 (step S349). The voice agent I/F 20 vocalizes the answer sentence data using the phoneme data of the specific agent and transmits the answer sentence data to the client terminal 1y. In the client terminal 1y, "A message has arrived from the user X" is reproduced through the voice of the specific agent.

Subsequently, the voice agent I/F 20 of the agent server 2 receives the spoken voice (for example, "Read the message") of the user Y from the client terminal 1y (step S352).

Subsequently, the voice agent I/F 20 converts the spoken voice (the question sentence data) of the user Y into text through the voice recognition and outputs the spoken voice to the dialogue processing unit 30 (step S355).

Subsequently, the language analysis unit 311 of the dialogue processing unit (herein, the character A dialogue processing unit 32) of the specific agent performs the language analysis (command analysis: reading of the message) on the question sentence data converted into text (step S358).

Subsequently, the answer sentence generation unit 320 generates the answer sentence data (for example, "I will read the message. "I really enjoyed myself today"") in accordance with the analyzed command (step S361).

Subsequently, the generated answer sentence data is output along with the phoneme data of the specific agent to the voice agent I/F 20 (step S364). The voice agent I/F 20 vocalizes the answer sentence data and transmits the amasser sentence data to the client terminal 1y, and the answer sentence data is reproduced through the voice of the specific agent in the client terminal 1y.

The above-described message transmission and reception process can be controlled by the message transmission and reception control unit 701 on the background and the content of the message can be stored in the user information DB 720.

(4-2-2. Process of Extracting Potential Customers)

Figure 19:
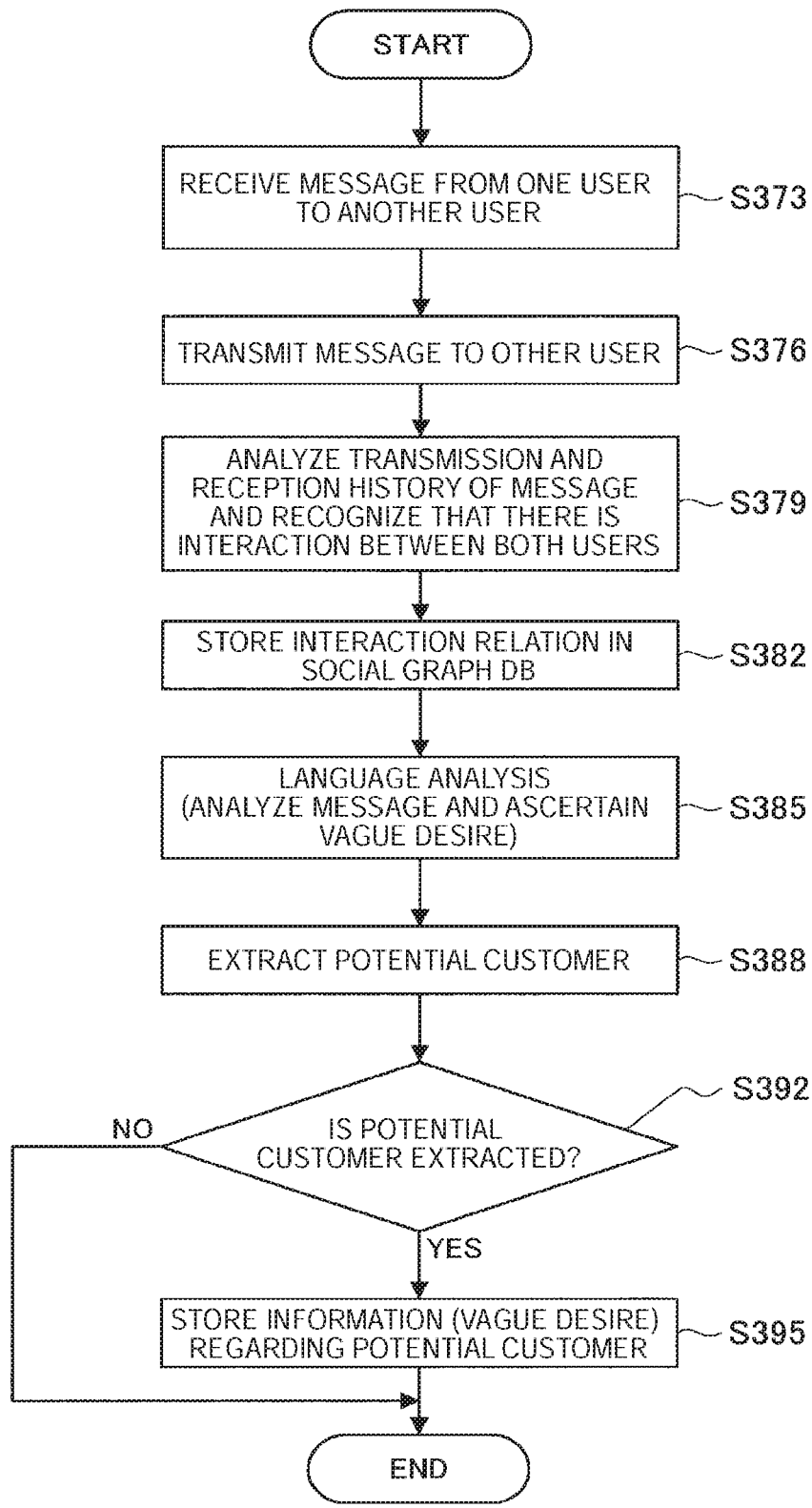
FIG. 19 is a flowchart illustrating a process of extracting potential customers based on transmitted and received messages according to the embodiment.

Next, a process of extracting potential customers by the advertisement insertion processing unit 70 will be described with reference to FIGS. 19 and 20. FIG. 19 is a flowchart illustrating a process of extracting potential customers based on transmitted and received messages.

As illustrated in FIG. 19, when the message is received from a message designated from one user to another user (step S373), the message transmission and reception control unit 701 first transmits the message to the other user (step S376). The case in which the transmission and the reception of the message is realized by the dialogue of the specific agent (the control via the dialogue processing unit 30) has been described above with reference to FIGS. 17 and 18. In addition, the content of the transmitted and received message is registered in the user information DB 720.

Subsequently, the social graph analysis unit 705 analyzes the transmission and reception history of the message registered in the user information DB 720 and recognizes that there is interaction between both the users who have exchanged the message (step S379).

Subsequently, the social graph analysis unit 705 stores the recognized interaction relation (analysis result) in the social graph DB 722.

Subsequently, the language analysis unit 706 analyzes the message registered in the user information DB 720 and analyzes a preference of the user (step S385) Herein, the preference of the user includes a potential preference and vague desire can be ascertained. For example, in a message with a friend, the "vague desire" such as "I want to go somewhere," "I want to eat delicious food," "I want to see beautiful scenery," or "I want to do something amusing" can be ascertained from a sentence indicating desires for which a designation or a behavior is not limited to one designation or behavior. For example, "vague desires" including various desires such as "I want to go a mountain," "I want to go to an amusement park," and "I want to go to Hawaii" can be determined from a sentence such as "I want to go somewhere."

Subsequently, the potential customer extraction unit 707 extracts a user whose vague desire is ascertained by the language analysis unit 706 as a potential customer (step S388).

Subsequently, in a case in which the potential customer can be extracted (Yes in step S392), the potential customer extraction unit 707 registers information (including the "vague desire") of the potential customer in the potential customer DB 723 (step S395).

The extraction of the potential customer according to the embodiment is not limited to the case based on the above-described message. The potential customer can be extracted on the basis of various kinds of user information such as a browsing history, a posting history, and schedule information. Herein, extraction of a potential customer based on a posting history will be described with reference to FIG. 20.

Figure 20:
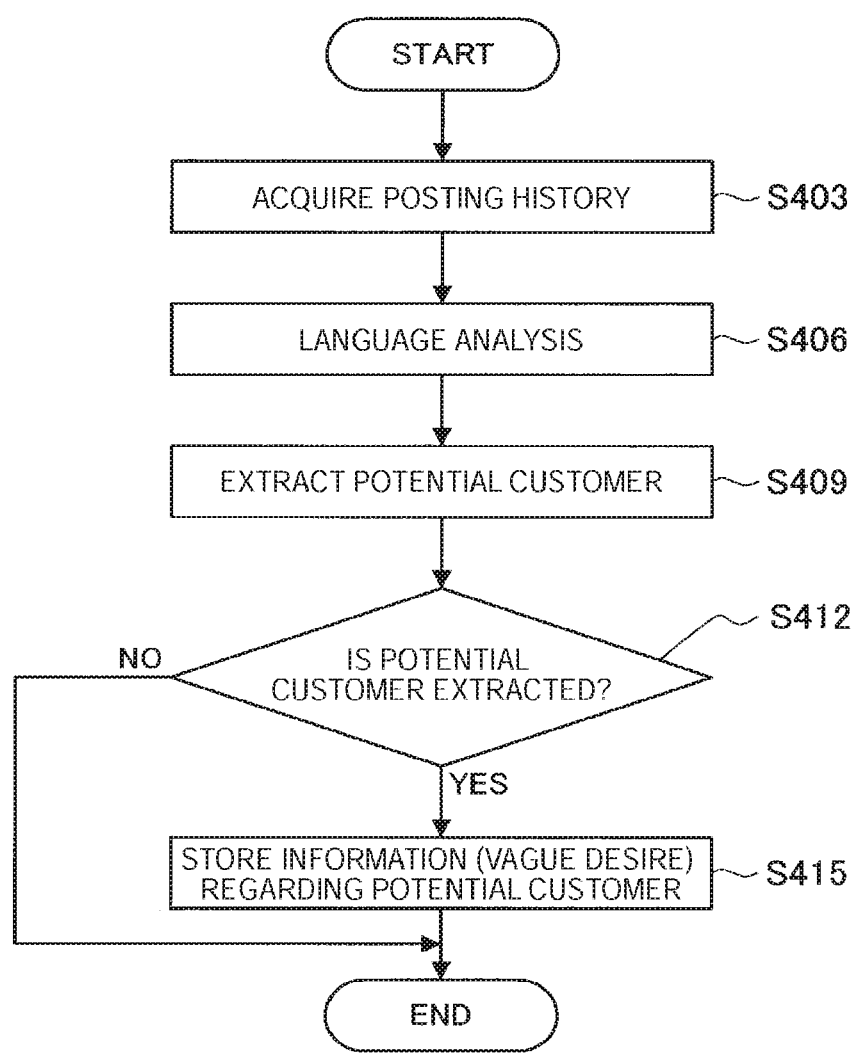
FIG. 20 is a flowchart illustrating a process of extracting potential customers based on a posting history according to the embodiment.

FIG. 20 is a flowchart illustrating a process of extracting potential customers based on a posting history according to the embodiment. As illustrated in FIG. 20, the social graph analysis unit 705 first acquires the posting history from the user information DB 720 (step S403), performs the language analysis of the posting content (step S406), and extracts a user whose vague desire is ascertained as a potential customer (step S409).

Subsequently, in a case in which the potential customer can be extracted (Yes in step S412), the potential customer extraction unit 707 registers information (including the "vague desire") regarding the potential customer in the potential customer DB 723 (step S415).

The extraction of the potential customer based on the posting history has been described above. When the potential customer is extracted on the basis of the browsing history and a browsing destination is a web site including keywords such as "special trip report" and "I want to go somewhere," vague desire such as "I want to go" is ascertained on the basis of the browsing history acquired from the user information DB 720. When the browsing destination is a web site including the keywords "special food report" and "I want to eat delicious food," vague desire such as "I want to eat" can be ascertained.

In addition, in the above-described embodiment, it is assumed that the transmission, reception history of the message or the posting history, and the like are stored in the user information DB 720, but the embodiment is not limited thereto. The social graph analysis unit 705 may acquire various kinds of user information from other servers (a message history server, a posting history server, a schedule server, and the like) via the communication unit of the agent server 2.

(4-2-3. Advertisement Output Process)

Figure 21:
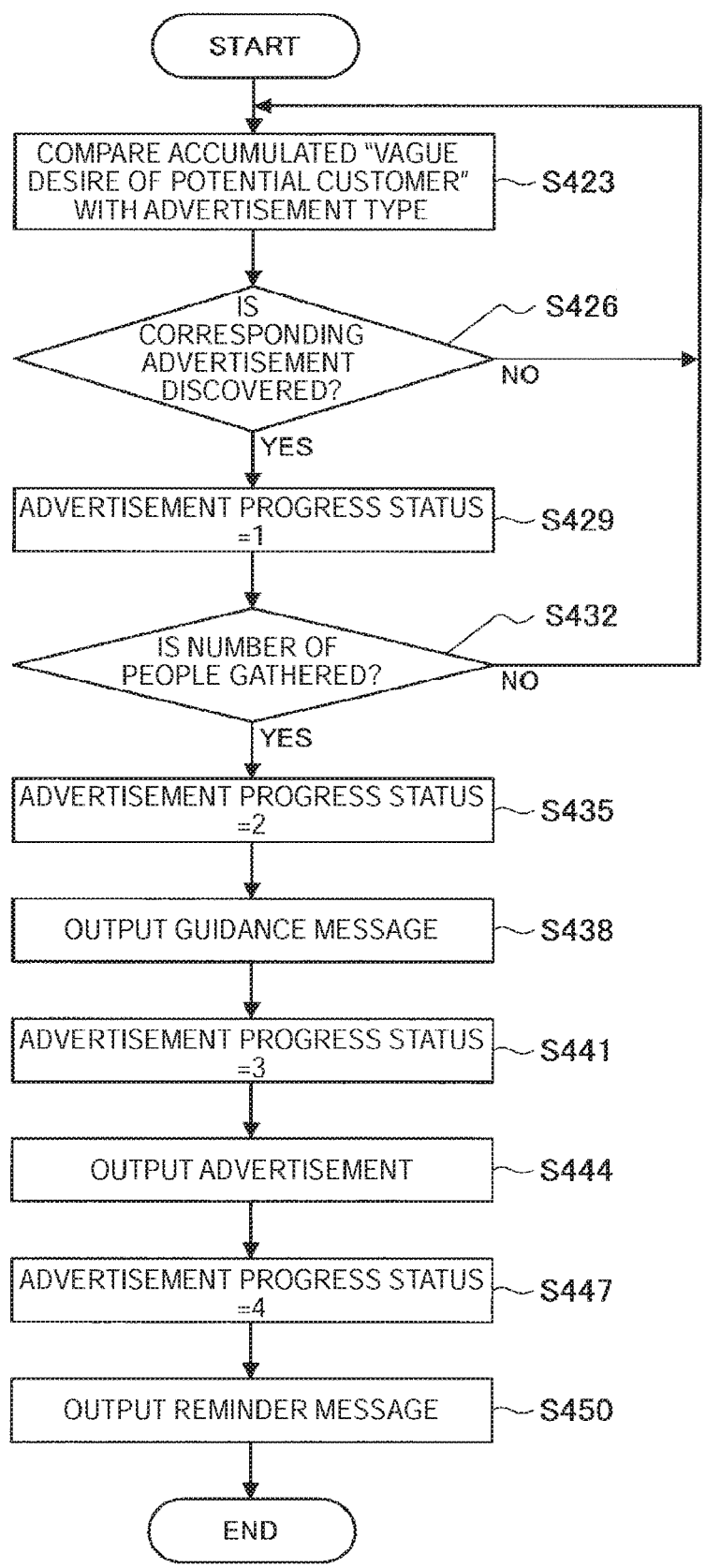
FIG. 21 is a flowchart illustrating an advertisement output process according to the embodiment.

Next, an advertisement output process will be described with reference to FIG. 21. FIG. 21 is a flowchart illustrating the advertisement output process according to the embodiment.

As illustrated in FIG. 21, the advertisement matching unit 708 first compares the "vague request of the potential customer" accumulated in the potential customer DB 723 with an advertisement type of the advertisement information stored in the advertisement DB 72 (step S423). Herein, an example of the advertisement information stored in the advertisement DB 72 is shown in the following Table 1.

TABLE 1

| Advertisement ID | Name | Advertisement type | Number of people | Good-value reason | Target | Goods content |
|---|---|---|---|---|---|---|
| 1 | Okinawa eating spree trip | Trip Eating spree | 2 or more | A tip to Okinawa is inexpensive now | Friend Family member | Okinawa trip |
| 2 | Soft down quilt | Seasonal goods | 10 or more | Disposal of excessive stock | Unspecified | Quilt |
| 3 | Hawaii trip | Trip | 2 or more | Occurrence of cancellation | Friend Family member | Hawaii trip |
| 4 | Hair crab big service | Seasonal goods Eating spree | 20 or more | Arrival of hair crab season | Unspecified | Hair crab |
| 5 | Piano lesson | Lesson | 1 or more | Free admission fee | Null | Piano Lesson |
| ... | ... | ... | ... | ... | ... | ... |

The advertisement DB 72 is included in the agent server 2 in the example illustrated in FIG. 3, but may also be an external independent server. In the advertisement DB 72, a distributor or an advertiser of a company can register advertisement information via an information processing device. When an advertisement is registered, a name of an advertisement target product, an advertisement type, the number of target people, a reason why the goods are good, a target person, goods content, and the like are input. Herein, an advertisement in which agreement of a plurality of people is advantageous to an advertiser and customers of an advertisement target product is also included. For example, a group trip and a joint purchase are assumed. In the group trip, it is possible to go out for a trip at a low price when friends accompany. In the joint purchase, it is possible to buy products at a low price when an unspecified large number of people are attracted. In addition, the embodiment is not limited to a plurality of human targets and an advertisement targeting one or more people is also, of course, included.

The advertisement matching unit 708 compares the advertisement type included in the advertisement information with the "vague request of a potential customer" accumulated in the potential customer DB 723. Herein, an example of a comparison table is shown in the following Table 2.

TABLE 2

| Vague desire | Advertisement type |
| --- | --- |
| I want to go | Trip |
| I want to eat | Eating spree |
| I want to see | Trip, Show |
| I want to do | Trip, Lesson |
| Season, I want to buy | Seasonal goods |

As shown in the foregoing Table 2, for example, "I want to go" is compared with a trip, "I want to eat" is compared with eating spree, "I want to see" is compared with a trip, and "I want to do" is compared with an advertisement type such as a trip or a hobby. Note that, for example, the advertisement such as "Okinawa eating spree trip" is compared as a corresponding advertisement even when the vague desire is "I want to go" and "1 want to eat."

Subsequently, in a case in which an advertisement corresponding to the vague desire of the potential customer is discovered through the comparison (Yes in step S426), the advertisement matching unit 708 associates the user ID of the potential customer and the advertisement ID and registers advertisement progress status=1 in the advertisement progress status DB 724 (step S429). For example, in a case in which the vague desire such as "I want to go somewhere" of the user X is registered, the advertisement matching unit 708 determines that Okinawa eating spree trip of the advertisement ID: 1 and Hawaii trip of the advertisement ID: 3 are corresponding advertisements because "advertisement type: trip" corresponds to the desire such as "I want to go somewhere" of the user X, and then registers advertisement progress status 1 in the advertisement progress status DB 724 by associating the advertisement ID with the ID of the user X. In addition, in a case in which the vague desire such as "I want to eat delicious food" of the user Y is registered, the advertisement matching unit 708 determines that Okinawa eating spree trip of the advertisement ID: 1 and Hair crab of the advertisement ID: 4 are corresponding advertisements because "advertisement type: food" corresponds to the desire, and then similarly registers the advertisement progress status 1 in the advertisement progress status DB 724. The advertisement progress statuses registered in this way are shown in the following Table 3.

TABLE 3

| User ID | Advertisement ID | Status |
| --- | --- | --- |
| X | 1 | 1 |
| X | 3 | 1 |
| Y | 1 | 1 |
| Y | 4 | 1 |
| ... | ... | ... |

Herein, the meanings of the registered advertisement progress statuses are as follows:
status 1: a target is decided;
status 2: the number of people is complete;
status 3: guided; and
status 4: an advertisement is delivered.

Subsequently, the advertisement matching unit 708 confirms whether a predetermined number of people of the advertisement target is gathered with reference to the advertisement progress status DB 724 (step S432). For example, in the example shown in the foregoing Table 3, in a case in which the user X and the user Y are both registered in Okinawa eating spree trip of the advertisement ID: 1 targeting two or more friends or family members and the social graph DB 722 can ascertain that both the users are in a friend relation with the social graph DB 722, the advertisement matching unit 708 determines that the target person condition of the advertisement ID: 1 is satisfied.

Subsequently, in a case in which the number of people is complete (Yes in step S432), the advertisement matching unit 708 updates the advertisement progress status to "status 2; the number of people is complete" (step S435). The updated advertisement progress status is shown in the following Table 4. Thus, the user X and the user Y are considered to be targets of the advertisement target pair of the advertisement ID: 1.

TABLE 4

| User ID | Advertisement ID | Status |
| --- | --- | --- |
| X | 1 | 2 |
| X | 3 | 1 |
| Y | 1 | 2 |
| Y | 4 | 1 |
| ... | ... | ... |

Subsequently, in a case in which "status 2" is registered with reference to the advertisement progress status DB 724, the advertisement information output control unit 709 performs control such that a guidance message is output to the target person (step S438). In a case in which the guidance message is output, the advertisement progress status is updated to "status 3: guided" (step S441).

For example, the advertisement information output control unit 709 may generate the guidance message using "Good-value reason" included in the advertisement information. For example, since the good-value reason of the advertisement ID: 1 is "A tip to Okinawa is inexpensive now," a guidance message "I heard that a tip to Okinawa is inexpensive now!" is generated and output to the dialogue processing unit 30. The dialogue processing unit 30 acquires phoneme data of the specific agent of each user corresponding to this guidance message and outputs the phoneme data to the voice agent I/F 20. The voice agent I/F 20 vocalizes the guidance message of each specific agent and transmits the guidance message to the client terminals 1x and 1y. In the client terminals 1x and 1y, "I heard that a tip to Okinawa is inexpensive now!" is spoken through the voice of each specific agent and interest in Okinawa is aroused. At this time point, both the users have not yet receive the advertisement information, but obtain the knowledge indicating that a tip to Okinawa is inexpensive now.

Subsequently, the advertisement information output control unit 709 outputs the advertisement at a predetermined timing (step S444) and updates the advertisement progress status to "status 4: an advertisement is delivered" (step S447). The predetermined timing may also be, for example, one day after from the output of the guidance message. As the guidance message, the advertisement is vocalized through the voice of the specific agent through the dialogue processing unit 30 through the voice agent I/F 20 to be reproduced in each client terminal 1.

Then, the advertisement information output control unit 709 may further output a reminder message (step S429). For example, in a case in which the user X who has interest in Okinawa because of the guidance message by the agent shows interest in Okinawa eating spree suggested later from the agent and tabs and browses a link of the advertisement displayed on the client terminal 1x, the paired user B is notified of a reminder message "the user X also has interest in "Okinawa eating spree trip" introduced some time ago!."

Thus, the interest of the user Y can be further aroused. Note that in a case in which the user Y tabs and browses the link of the advertisement, the advertisement information output control unit 709 may notify the user X that the user Y shows the interest. Thus, the user X and the user Y who are friends originally have different vague desires "I want to go" and "I want to eat," but the users are known to have the interest in the same product (Okinawa eating spree trip) and the users are induced to keep in touch with each other and purchase the product.

The advertisement output process according to the embodiment has been described above. Note that the advertisement output process of the advertisement ID: 1 has been described in the above-described example. An advertisement output process of a joint purchase goods (advertisement ID: 2) targeting an unspecified large number of people (also including strangers) will also be described as an example.

For example, in a case in which it is ascertained that the user Z posts "I want shopping for winter" on SNS and has vague desire "I want to buy seasonal product," the advertisement matching unit 708 compares the advertisement information shown in the foregoing Table 1 and associates the advertisement ID: 2 "quilt" and the advertisement ID: 4 "hair crab" with each other. Here, it is assumed that for the advertisement ID: 4, the user Y has already been targeted and other 10 users are also targeted. An example of the advertisement statuses of this case is shown in the following Table 5.

TABLE 5

| User ID | Advertisement ID | Status |
|---------|------------------|--------|
| X | 1 | 1 |
| X | 3 | 1 |
| Y | 1 | 1 |
| Y | 4 | 1 |
| Z | 2 | 1 |
| Z | 4 | 1 |
| ... | ... | ... |

In addition, the advertisement matching unit 708 ascertains that the user Y, the user Z, and the other 10 peoples (not shown) who are the targets of the advertisement ID: 4 are not stored as friends (that is, strangers) with reference to the social graph DB 722. The advertisement matching unit 708 determines that a target person condition is satisfied since the target person condition of the advertisement ID: 4 is "the unspecified large number of peoples equal to or more than 10," and thus updates the advertisement progress status to "status 2: the number of people is complete."

Subsequently, the advertisement information output control unit 709 generates a guidance message using the good-value reason "Arrival of hair crab season" of the advertisement ID: 4 for the target person of the advertisement 4 updated to "status 2" and notifies the target person of the guidance message. "Hair crab season arrives!" is spoken through the voice of each specific agent in the client terminal 1 of each target person and each user obtains the knowledge of the hair crab season. At this time, the advertisement progress status is updated to "status 3: guided."

Then, for example, one day after from the notification of the guidance message, the advertisement information output control unit 709 notifies each user who is a target of the advertisement ID: 4 of the advertisement information of the advertisement ID: 4. In the client terminal 1 of each user, the advertisement information is read out by each specific agent. At this time, the advertisement progress status is updated to "status 4: an advertisement is delivered."

Subsequently, in a case in which several people who have interest in the hair crab season by the previous guidance message among the users have interest in the notified advertisement and tab and browse a link of the advertisement, the advertisement information output control unit 709 notifies users who have not yet tab the link of the advertisement of a reminder message "Seven people have interest in the earlier advertisement!." In this way, even in a case of the joint purchase targeted by the strangers, it is possible to prompt the purchase of the product by notifying the users of the number of people who show the interest using the reminder message.

(4-2-4. Advertisement Information Reception Process)

Figure 22:
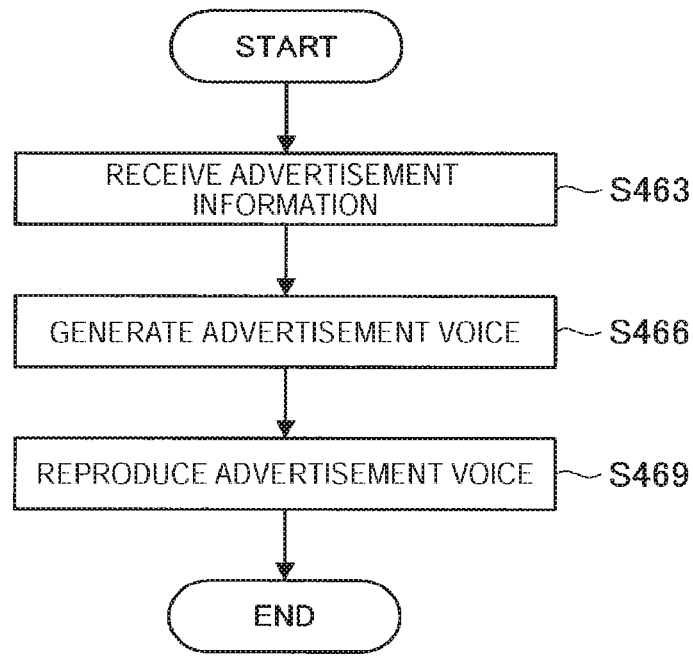
FIG. 22 is a flowchart illustrating an advertisement information reception process according to the embodiment.

Next, an operation process by the client terminal 1 receiving the above-described advertisement information will be described with reference to FIG. 22. FIG. 22 is a flowchart illustrating an advertisement information reception process according to the embodiment.

As illustrated in FIG. 22, the client terminal 1 receives the advertisement information from the agent server 2 (step S463). Herein, for example, the advertisement information (text data) and the phoneme data (the phoneme data of the specific agent) are assumed to be received.

Subsequently, the client terminal 1 vocalizes the received advertisement information using the phone data through the voice of the specific agent (generates an advertisement voice) (step S466) and reproduces the advertisement voice from the speaker of the client terminal 1 (step S469). Note that the client terminal 1 can also receive the advertisement voice vocalized through the voice agent I/F 20 and reproduce the advertisement voice from the speaker without change.

(4-2-5. Guidance/Reminder Message Reception Process)

Figure 23:
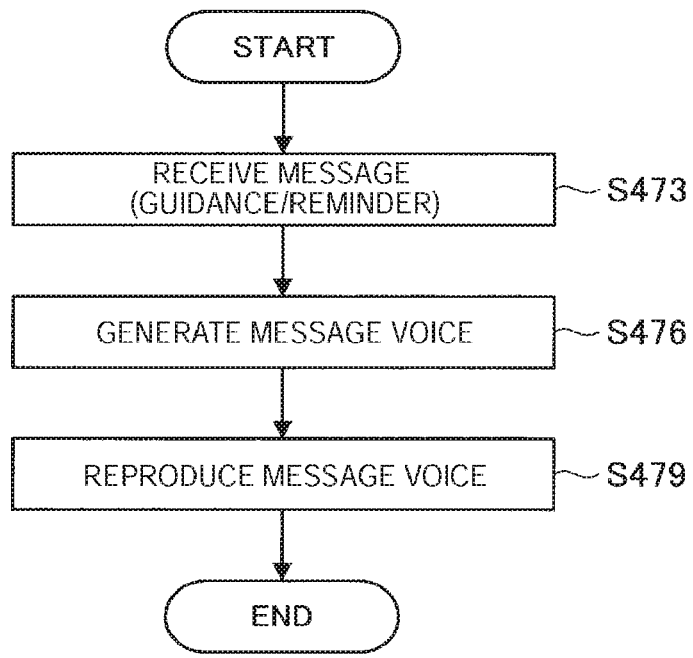
FIG. 23 is a flowchart illustrating a guidance/reminder message reception process according to the embodiment.

Next, an operation process by the client terminal 1 receiving the above-described guidance/reminder message will be described with reference to FIG. 22. FIG. 23 is a flowchart illustrating a guidance/reminder message reception process according to the embodiment.

As illustrated in FIG. 23, the client terminal 1 receives the guidance/reminder message from the agent server 2 (step S473). Herein, for example, the guidance/reminder message (text data) and the phoneme data (the phoneme data of the specific agent) are assumed to be received.

Subsequently, the client terminal 1 vocalizes the received guidance/reminder message using the phoneme data through the voice of the specific agent (generates a message voice) (step S476) and reproduces the guidance/reminder message from the speaker of the client terminal 1 (step S479). Note that the client terminal 1 can also receive the guidance/reminder message voice vocalized through the voice agent I/F 20 and reproduces the guidance/reminder message voice from the speaker without change.

5. CONCLUSION

As described above, in the communication control system according to the embodiment of the present disclosure, it is possible to arouse potential requests of users and present more effective advertisement information.

Thus, it is possible to extract potential customers from vague desires of the users and obtain the effective advertisement effect. In addition, with regard to use in a group or joint purchases, target people can be effectively matched and a purchase hit rate can be raised.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to also generate a computer program causing hardware such as the CPU, the ROM, and the RAM contained in the client terminal 1 or the agent server 2 described above to realize the function of the client terminal 1 or the agent server 2. In addition, a computer-readable storage medium that stores the computer program is also provided.

In addition, in the above-described embodiment, the configuration in which various functions are realized by the agent server 2 on the Internet has been described, but the embodiment is not limited thereto. At least a part of the configuration of the agent server 2 illustrated in FIG. 3 may be realized in the client terminal 1 (a smartphone, a wearable terminal, or the like) of the user. In addition, the whole configuration of the agent server 2 illustrated in FIG. 3 may be installed in the client terminal 1 so that the client terminal 1 can perform all the processes.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication system including: a communication unit configured to collect a use situation of a service or a client terminal of a user; and a control unit configured to analyze a preference in accordance with the use situation of the user collected via the communication unit, to transmit a guidance message for arousing interest in a specific product to a client terminal of the user via the communication unit such that the guidance message is output as speech of an agent of the client terminal when at least the one user is determined to be a potential customer of the product in accordance with an analysis result of the preference, and to perform control such that an advertisement for promoting the product is transmitted to the client terminal of the user via the communication unit and the advertisement is output as speech of the agent of the client terminal at a predetermined timing after the transmission of the guidance message.

(2)

The communication system according to (1), in which, when a plurality of users are determined to be potential customers of a specific product in accordance with an analysis result of preferences, the control unit transmits a guidance message for arousing interest in the product to client terminals of the plurality of users via the communication unit such that the guidance message is output as speech of agents of the client terminals, and the control unit performs control such that an advertisement for promoting the product is transmitted to the client terminals of the plurality of users via the communication unit at a predetermined timing after the transmission of the guidance message and the advertisement is output as the speech of the agents of the client terminals.

(3)

The communication system according to (2), in which, when a condition according to an attribute of the specific product is satisfied, the control unit performs control such that the guidance message is transmitted to the client terminals of the plurality of users via the communication unit.

(4)

The communication system according to (3), in which the specific product becomes purchasable when a certain number of customers or more are attracted.

(5)

The communication system according to any one of (2) to (4), in which the control unit estimates a social graph indicating a relation between users in accordance with the use situation of the service of the user, and when the plurality of users who are the potential customers of the specific product are determined to be acquaintances on a basis of the social graph, the control unit performs control such that the guidance message is transmitted to the client terminals of the plurality of users via the communication unit.

(6)

The communication system according to any one of (2) to (5), in which, when the number of the plurality of users who are the potential customers of the specific product reaches a target number of people, the control unit performs control such that the guidance message is transmitted to the client terminals of the plurality of users via the communication unit.

(7)

The communication system according to any one of (2) to (5), in which, after the control unit transmits the advertisement for promoting the product via the communication unit at a predetermined timing, the control unit performs control such that information indicating that an acquaintance is also expressing interest in the advertisement is transmitted to the client terminals of the plurality of users on a basis of a social graph indicating a relation between the users estimated in accordance with the use situation of the service of the user, and the information is output as speech of the agents of the client terminals.

(8)

The communication system according to any one of (2) to (7), in which, after the control unit transmits the advertisement for promoting the product via the communication unit at a predetermined timing, the control unit performs control such that information indicating a number of users expressing interest in the advertisement is transmitted to the client terminals of the plurality of users and the information is output as speech of the agents of the client terminals.

(9)

A communication control method including: by a processor, collecting a use situation of a service or a client terminal of a user via a communication unit;

analyzing a preference in accordance with the use situation of the user collected via the communication unit;

transmitting a guidance message for arousing interest in a specific product to a client terminal of the user via the communication unit such that the guidance message is output as speech of an agent of the client terminal when at least the one user is determined to be a potential customer of the product in accordance with an analysis result of the preference; and performing control such that an advertisement for promoting the product is transmitted to the client terminal of the user via the communication unit such that the advertisement is output as speech of the agent of the client terminal at a predetermined timing after the transmission of the guidance message.

REFERENCE SIGNS LIST 1 client terminal
2 agent server
30 dialogue processing unit
300 dialogue processing unit
310 question sentence retrieval unit
320 answer sentence generation unit
330 conversation DB
340 phoneme data acquisition unit
31 basic dialogue processing unit
32 character A dialogue processing unit
33 person B dialogue processing unit
34 person C dialogue processing unit
40 phoneme storage unit
41 basic phoneme DB
42 character A phoneme DB
43 person B phoneme DB
44 person C phoneme DB
50 conversation DB generation unit
60 phoneme DB generation unit
70 advertisement insertion processing unit
701 message transmission and reception control unit
702 browsing history acquisition unit
703 posting history acquisition unit
704 schedule management unit
705 social graph analysis unit
706 language analysis unit
707 potential customer extraction unit 707
708 advertisement matching unit
709 advertisement information output control unit
720 user information DB
721 schedule DB
722 social graph DB
723 potential customer DB
724 advertisement progress status DB
72 advertisement DB
80 feedback acquisition processing unit
3 network
10 agent

The invention claimed is:

1. A communication system, comprising:
communication circuitry; and
processing circuitry coupled with the communication circuitry and configured to:
collect a piece of user information of a user via the communication circuitry, the piece of user information corresponding to a browsing history on the Internet of the user or a posting history on the Internet of the user;
analyze the collected piece of user information to obtain a user preference of the user;
identify a piece of advertisement stored in a storage as targeting the user according to the user preference of the user; and
after the piece of advertisement is identified as targeting the user, generate a guidance message based on text information stored in the storage in association with the piece of advertisement,
generate a first piece of vocalized speech data for presenting the guidance message according to phoneme data corresponding to a voice agent and transmit the first piece of vocalized speech data to a client terminal of the user via the communication circuitry, and
at a timing of at least a predetermined duration after the first piece of vocalized speech data is transmitted to the client terminal and in response to detection of a keyword in a dialogue session between the client terminal and the communication system, generate a second piece of vocalized speech data for presenting content of the piece of advertisement different from the text information according to the phoneme data corresponding to the voice agent and transmit the second piece of vocalized speech data to the client terminal of the user via the communication circuitry as a part of the dialogue session.

2. The communication system according to claim 1, wherein the processing circuitry is configured to:
identify the piece of advertisement stored in the storage as targeting one or more other users according to one or more other pieces of user information of the one or more other users; and
after the piece of advertisement is identified as targeting the user and the one or more other users,
transmit the first piece of vocalized speech data and first one or more other pieces of vocalized speech data for presenting the guidance message to the client terminal and one or more other client terminals of the one or more other users via the communication circuitry, and
transmit the second piece of vocalized speech data and second one or more other pieces of vocalized speech data for presenting the content of the piece of advertisement to the client terminal and the one or more other client terminals of the one or more other users via the communication circuitry after the first piece of vocalized speech data and the first one or more other pieces of vocalized speech data for presenting the guidance message are transmitted to the client terminal and the one or more other client terminals of the one or more other users.

3. The communication system according to claim 2, wherein the processing circuitry is configured to:
transmit the first piece of vocalized speech data and the first one or more other pieces of vocalized speech data for presenting the guidance message to the client terminal and the one or more other client terminals via the communication circuitry after a condition according to an attribute stored in the storage in association with the piece of advertisement is satisfied.

4. The communication system according to claim 2, wherein the processing circuitry is configured to:
determine a product promoted by the piece of advertisement as purchasable when a number of potential customers that are determined to be attracted to the product is equal to or greater than a threshold number.

5. The communication system according to claim 2, wherein the processing circuitry is configured to:

estimate a social graph indicating a relation of the user and the one or more other users according to the pieces of user information of the user and the one or more other users; and transmit the first piece of vocalized speech data and the first one or more other pieces of vocalized speech data for presenting the guidance message to the client terminal and the one or more other client terminals of the one or more other users via the communication circuitry after the user and the one or more other users are determined to be acquaintances according to the social graph.

6. The communication system according to claim 2, wherein the processing circuitry is configured to:

transmit the first piece of vocalized speech data and the first one or more other pieces of vocalized speech data for presenting the guidance message to the client terminal and the one or more other client terminals of the one or more other users via the communication circuitry after a total number of the user and the one or more other users reaches a target number.

7. The communication system according to claim 2, wherein the processing circuitry is configured to:

estimate a social graph indicating a relation of the user and the one or more other users according to the pieces of user information of the user and the one or more other users; and after the second piece of vocalized speech data and the second one or more other pieces of vocalized speech data for presenting the content of the piece of advertisement are transmitted to the client terminal and the one or more other client terminals via the communication circuitry, transmit a third piece of vocalized speech data indicating that an acquaintance is also expressing interest in the piece of advertisement to the client terminal after the user and the one or more other users are determined to be acquaintances according to the social graph.

8. The communication system according to claim 2, wherein the processing circuitry is configured to:

after the second piece of vocalized speech data and the second one or more other pieces of vocalized speech data for presenting the content of the piece of advertisement are transmitted to the client terminal and the one or more other client tell finals via the communication circuitry, transmit a third piece of vocalized speech data indicating a number of users expressing interest in the piece of advertisement to the client terminal.

9. The communication system according to claim 1, wherein the predetermined duration is one day.

10. The communication system according to claim 1, wherein the processing circuitry is configured to:

in response to the piece of advertisement being identified as targeting the user, register in an advertisement progress record a piece of advertisement progress status in association with an advertisement identifier and a user identifier of the user;

in response to the first piece of vocalized speech data being transmitted to the client terminal of the user, update the piece of advertisement progress status to have a first status indicating that the guidance message has been output to the user;

determine whether to transmit the second piece of vocalized speech data according to the piece of advertisement progress status; and in response to the second piece of vocalized speech data being transmitted to the client terminal of the user, update the piece of advertisement progress status to have a second status indicating that the content of the piece of advertisement has been output to the user.

11. A communication control method, comprising:

collecting, by processing circuitry of an apparatus via communication circuitry of the apparatus, a piece of user information a user, the piece of user information corresponding to a browsing history on the Internet of the user or a posting history on the Internet of the user;

analyzing the collected piece of user information to obtain a user preference of the user;

identifying a piece of advertisement stored in a storage as targeting the user according to the user preference of the user; and after the piece of advertisement is identified as targeting the user, generating, by the processing circuitry, a guidance message based on text information stored in the storage in association with the piece of advertisement, generating a first piece of vocalized speech data for presenting the guidance message according to phoneme data corresponding to a voice agent and transmit the first piece of vocalized speech data to a client terminal of the user via the communication circuitry, and at a timing of at least a predetermined duration after the first piece of vocalized speech data is transmitted to the client terminal and in response to detection of a keyword in a dialogue session between the client terminal and the communication system, generating a second piece of vocalized speech data for presenting content of the piece of advertisement different from the text information according to the phoneme data corresponding to the voice agent and transmit the second piece of vocalized speech data to the client terminal of the user via the communication circuitry as a part of the dialogue session.

12. The communication control method according to claim 11, further comprising:

identifying the piece of advertisement stored in the storage as targeting one or more other users according to one or more other pieces of user information of the one or more other users; and after the piece of advertisement is identified as targeting the user and the one or more other users, transmitting the first piece of vocalized speech data and first one or more other pieces of vocalized speech data for presenting the guidance message to the client terminal and one or more other client terminals of the one or more other users via the communication circuitry, and transmitting the second piece of vocalized speech data and second one or more other pieces of vocalized speech data for presenting the content of the piece of advertisement to the client terminal and the one or more other client terminals of the one or more other users via the communication circuitry after the first piece of vocalized speech data and the first one or more other pieces of vocalized speech data for presenting the guidance message are transmitted to the client terminal and the one or more other client terminals of the one or more other users.

13. The communication control method according to claim 11, wherein the transmitting the first piece of vocalized speech data and the first one or more other pieces of vocalized speech data for presenting the guidance message to the client terminal and the one or more other client terminals of the one or more other users via the communication circuitry is performed after a total number of the user and the one or more other users reaches a target number.

14. The communication control method according to claim 11, wherein the predetermined duration is one day.

* * * * *